(12) United States Patent
Watanabe et al.

(10) Patent No.: US 12,350,568 B2
(45) Date of Patent: Jul. 8, 2025

(54) GOLF SWING ANALYSIS SYSTEM, GOLF SWING ANALYSIS METHOD, AND INFORMATION STORAGE MEDIUM

(71) Applicant: Rakuten Group, Inc., Tokyo (JP)

(72) Inventors: Tetsu Watanabe, Tokyo (JP); Ryuji Iwaya, Tokyo (JP); Masahiro Kuwahara, Tokyo (JP); Takumi Umemura, Tokyo (JP); Yosuke Shimada, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 294 days.

(21) Appl. No.: 17/523,426

(22) Filed: Nov. 10, 2021

(65) Prior Publication Data

US 2022/0203200 A1 Jun. 30, 2022

(30) Foreign Application Priority Data

Dec. 28, 2020 (JP) .................................. 2020-219616

(51) Int. Cl.
*A63B 69/36* (2006.01)
*A63B 24/00* (2006.01)
(Continued)

(52) U.S. Cl.
CPC ...... *A63B 69/3623* (2013.01); *A63B 24/0006* (2013.01); *A63B 71/06* (2013.01);
(Continued)

(58) Field of Classification Search
CPC . A63B 69/3623; A63B 24/0006; A63B 71/06; A63B 2071/0677; A63B 2220/806;
(Continued)

(56) References Cited

U.S. PATENT DOCUMENTS 6,514,081 B1 * 2/2003 Mengoli ............... A63B 69/36
434/428
9,211,439 B1 * 12/2015 Pedenko ............... A63B 69/36
(Continued)

FOREIGN PATENT DOCUMENTS

JP 2010-82430 A 4/2010
JP 2012-110594 A 6/2012
(Continued)

OTHER PUBLICATIONS

Office Action dated Nov. 1, 2022 issued by the Japanese Patent Office in Japanese Application No. 2022-003593.
(Continued)

*Primary Examiner* — Nini F Legesse
(74) *Attorney, Agent, or Firm* — Sughrue Mion, PLLC

(57) ABSTRACT

A captured video image obtaining unit 70 obtains a captured video image in which a player making a golf swing is captured. A swing path type specifying unit 86 specifies at least one reference angle based on at least one of a position of a predetermined body part of the player at address or a position of a shaft at address, where the positions are specified based on the captured video image. A swing path type specifying unit 86 specifies a downswing angle of a club head captured in a captured video image based on the captured video image. The swing path type specifying unit 86 compares the reference angle with the downswing angle.

10 Claims, 22 Drawing Sheets

(51) Int. Cl.
*A63B 71/06* (2006.01)
*G06V 40/20* (2022.01)

(52) U.S. Cl.
CPC ...... *G06V 40/23* (2022.01); *A63B 2071/0677* (2013.01); *A63B 2220/806* (2013.01)

(58) Field of Classification Search
CPC ................ A63B 69/36; A63B 71/0622; A63B 2071/0647; G06V 40/23; G06T 2207/10016; G06T 2207/30221; G06T 7/20; G06N 20/00
USPC ......................................... 473/221, 266, 409
See application file for complete search history.

(56) References Cited

U.S. PATENT DOCUMENTS

| | | | | |
|---|---|---|---|---|
| 9,514,379 | B2* | 12/2016 | Park | G09B 19/0038 |
| 9,946,346 | B2* | 4/2018 | Kawamura | G06F 3/04855 |
| 10,354,550 | B2* | 7/2019 | Ito | A61B 5/1122 |
| 10,894,186 | B2* | 1/2021 | Redgård | A63B 24/0006 |
| 2005/0215336 | A1* | 9/2005 | Ueda | A63B 24/0003 |
| | | | | 473/131 |
| 2005/0272517 | A1* | 12/2005 | Funk | A63B 24/0003 |
| | | | | 473/222 |
| 2006/0247070 | A1 | 11/2006 | Funk et al. | |
| 2011/0212791 | A1* | 9/2011 | Ueda | A63B 69/3605 |
| | | | | 473/409 |
| 2011/0299729 | A1* | 12/2011 | Dawe | G06T 7/246 |
| | | | | 382/103 |
| 2012/0088544 | A1* | 4/2012 | Bentley | A63F 13/332 |
| | | | | 455/556.1 |
| 2012/0136464 | A1 | 5/2012 | Saito et al. | |
| 2012/0316004 | A1* | 12/2012 | Shibuya | A63B 24/0006 |
| | | | | 473/223 |
| 2013/0102419 | A1* | 4/2013 | Jeffery | A63B 24/0006 |
| | | | | 473/409 |
| 2013/0274027 | A1* | 10/2013 | Saito | G09B 19/0038 |
| | | | | 473/409 |
| 2014/0018181 | A1* | 1/2014 | Blake | G09B 19/0038 |
| | | | | 473/409 |
| 2014/0286619 | A1 | 9/2014 | Nakagome et al. | |
| 2014/0357427 | A1* | 12/2014 | Ishikawa | H04M 1/72412 |
| | | | | 473/407 |
| 2017/0021227 | A1 | 1/2017 | Hayaishi | |
| 2017/0154427 | A1 | 6/2017 | Marvin | |
| 2017/0296871 | A1 | 10/2017 | Kiryu et al. | |
| 2017/0361193 | A1* | 12/2017 | Molinari | A63B 24/0003 |
| 2020/0094122 | A1 | 3/2020 | Yamazaki et al. | |
| 2022/0366577 | A1 | 11/2022 | Nagai | |
| 2023/0398408 | A1 | 12/2023 | Lee | |

FOREIGN PATENT DOCUMENTS

| | | |
|---|---|---|
| JP | 2014-186168 A | 10/2014 |
| JP | 2016-126509 A | 7/2016 |
| JP | 2017-23506 A | 2/2017 |
| JP | 2017-174094 A | 9/2017 |
| JP | 2017-189490 A | 10/2017 |
| JP | 6763559 B1 | 9/2020 |
| WO | 2018/220948 A1 | 12/2018 |

OTHER PUBLICATIONS

Gines Hidalgo Martinez, et al. "OpenPose: Whole-Body Pose Estimation", Carnegie Mellon University, Apr. 2019, Technical Report Number:CMU-RI-TR-19-15 (31 pages).

* cited by examiner

FIG.10

| |
|---|
| P(n,b) |
| P(n,c) |
| P(n+1,b) |
| P(n+1,c) |
| P(n,b)−P(n+1,a) |
| P(n,b)−P(n+1,b) |
| P(n,c)−P(n+1,a) |
| P(n,c)−P(n+1,b) |

FIG.12

| |
|---|
| P(n,b) |
| P(n,c) |
| P(n+1,b) |
| P(n+1,c) |
| P(n,b)-P(n+1,a) |
| P(n,b)-P(n+1,b) |
| P(n,c)-P(n+1,a) |
| P(n,c)-P(n+1,b) |
| P(n+2,b) |
| P(n,b)-P(n+2,a) |
| P(n,c)-P(n+2,a) |
| P(n+1,c)-P(n+2,b) |
| P(n,b)-P(n+1,a)-P(n+2,a) |

|  | INSIDE-OUT | INSIDE-IN | OUTSIDE-IN |
|---|---|---|---|
| OPEN |  |  |  |
| SQUARE |  |  |  |
| CLOSED |  |  |  | ratio of a user terminal according to an embodiment of the present invention;

GOLF SWING ANALYSIS SYSTEM, GOLF SWING ANALYSIS METHOD, AND INFORMATION STORAGE MEDIUM

CROSS-REFERENCE TO RELATED APPLICATIONS

The present application claims priority from Japanese application JP 2020-219616 filed on Dec. 28, 2020, the content of which is hereby incorporated by reference into this application.

BACKGROUND OF THE INVENTION

1. Field of the Invention

The present invention relates to a golf swing analysis system, a golf swing analysis method, and an information storage medium.

2. Description of the Related Art

JP2014-186168A describes a technique for displaying a histogram generated with elements such as the inclination of both shoulders, the position of the wrist, the center position of the stance, the width of the stance, and the swing plane angle of the player making a golf swing.

SUMMARY OF THE INVENTION

Even if the technique described in JP2014-186168A is used, a general player who does not have knowledge about golf, such as a range of an appropriate swing plane angle, cannot grasp whether the swing is correctly performed.

One or more embodiments of the present invention have been conceived in view of the above, and an object thereof is to provide a golf swing analysis system, a golf swing analysis method, and an information storage medium enabling a player to easily grasp whether the player has made a correct swing.

A golf swing analysis system according to the present invention includes captured video image obtaining means for obtaining a captured video image in which a player making a golf swing is captured, reference angle specifying means for specifying at least one reference angle based on at least one of a position of a predetermined body part of the player at address or a position of a shaft at address, where the positions are specified based on the captured video image, downswing angle specifying means for specifying a downswing angle of a club head captured in the captured video image based on the captured video image, and comparing means for comparing the reference angle with the downswing angle.

In one aspect of the present invention, the golf swing analysis system further includes swing path type specifying means for specifying a type of a swing path of the swing based on a comparison result of the reference angle and the downswing angle.

In this aspect, the reference angle specifying means may specify a first reference angle based on the position of the predetermined body part. The reference angle specifying means may specify a second reference angle based on the position of the shaft. The swing path type specifying means may specify whether the swing path of the swing is inside-out, inside-in, or outside-in based on the first reference angle, the second reference angle, and the downswing angle.

In one aspect of the present invention, the reference angle specifying means specifies the reference angle based on the position of the predetermined body part and a position of a ball before swing, where the positions are specified based on the captured video image.

In this aspect, the golf swing analysis system may further include ball path specifying means for specifying a path of a ball captured in the captured video image based on the captured video image, and the reference angle specifying means may specify the reference angle based on a position of the ball before swing, the position being specified based on the path of the ball.

In one aspect of the present invention, the reference angle specifying means specifies the reference angle represented in a two-dimensional image coordinate system of the captured video image, and the downswing angle specifying means specifies the downswing angle represented in the two-dimensional image coordinate system of the captured video image.

In one aspect of the present invention, the captured video image obtaining means obtains the captured video image in which the player viewed from rearward of a target direction of the ball is captured.

In one aspect of the present invention, the golf swing analysis system may further include analysis video image generating means for generating an analysis video image in which a line representing the reference angle is overlaid on the captured video image.

A golf swing analysis method according to the present invention includes the steps of obtaining a captured video image in which a player making a golf swing is captured, specifying at least one reference angle based on at least one of a position of a predetermined body part of the player at address or a position of a shaft at address, where the positions are specified based on the captured video image, specifying a downswing angle of a club head captured in the captured video image based on the captured video image, and comparing the reference angle with the downswing angle.

A non-transitory computer readable information storage medium storing a program according to the present invention causes a computer to execute obtaining a captured video image in which a player making a golf swing is captured, specifying at least one reference angle based on at least one of a position of a predetermined body part of the player at address or a position of a shaft at address, where the positions are specified based on the captured video image, specifying a downswing angle of a club head captured in the captured video image based on the captured video image, and comparing the reference angle with the downswing angle.

BRIEF DESCRIPTION OF THE DRAWINGS

FIG. 10 is a diagram illustrating an example of a path list candidate;

FIG. 12 is a diagram illustrating an example of a path list candidate;

DETAILED DESCRIPTION OF THE INVENTION

An embodiment of the present invention will be described below with reference to the accompanying drawings.

Figure 1:
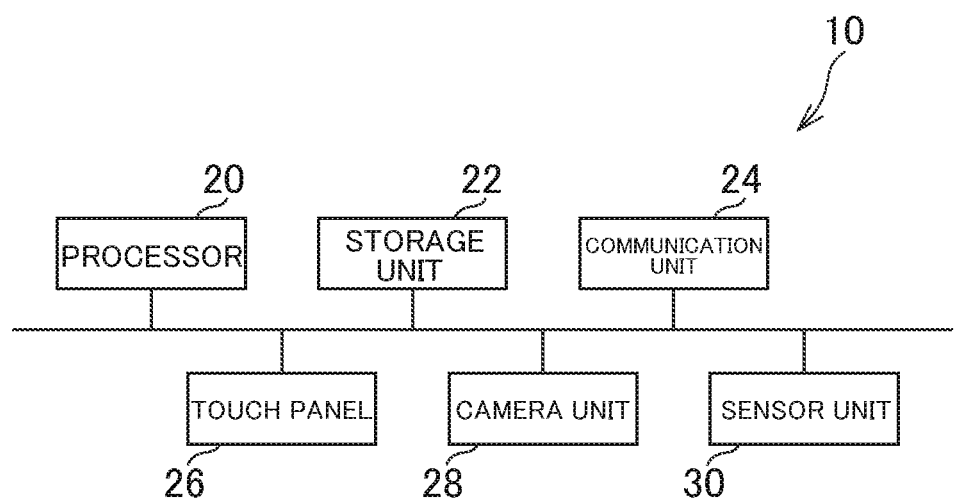
FIG. 1 is a diagram illustrating an example of a configuration of a user terminal according to an embodiment of the present invention.

FIG. 1 is a diagram illustrating an example of a configuration of a user terminal 10 according to an embodiment of the present invention.

The user terminal 10 according to the present embodiment is a computer such as a mobile phone (including a smart phone) and a portable information terminal (including a tablet computer). As shown in FIG. 1, the user terminal 10 according to the present embodiment includes a processor 20, a storage unit 22, a communication unit 24, a touch panel 26, a camera unit 28, and a sensor unit 30.

For example, the processor 20 is a program control device, such as a microprocessor, that operates in accordance with a program installed in the user terminal 10. The storage unit 22 is, for example, storage elements such as a ROM and a RAM, and a solid-state drive (SSD). The storage unit 22 stores programs to be executed by the processor 20, for example. The communication unit 24 is a communication interface for wired or wireless communication, for example, and transfers data to and from a computer, such as a server, via a computer network, such as the Internet.

The touch panel 26 displays and outputs information according to an instruction from the processor 20 and outputs an operation performed by a user to the processor 20, for example.

The camera unit 28 is a capturing device, such as a digital video camera, capable of taking a video image, for example.

The sensor unit 30 is a sensing device, such as a GPS module, an acceleration sensor, and a motion sensor. In the present embodiment, the sensor unit 30 is included in the user terminal 10, although the sensor unit 30 may be outside of the user terminal 10.

In the present embodiment, for example, a user who operates the user terminal 10 (hereinafter referred to as an operating user) captures a player making a golf swing with the camera unit 28 of the user terminal 10 in a golf course or a golf practice range. Subsequently, a video image of the player making the golf swing is generated.

In the present embodiment, prior to capturing a swing, a position and an inclination of the user terminal 10 are adjusted so that a position of the player with respect to the position of the camera unit 28 is within a predetermined allowable range and an orientation of the player to the capturing direction is within a predetermined allowable range. In the present embodiment, when the user terminal 10 is adjusted and then the operating user performs a predetermined operation, the camera unit 28 captures an image of the player, and a video image showing the player making a swing is generated. In this embodiment, assume that a video image having a predetermined frame rate (e.g., 60 fps) is generated.

In the present embodiment, camera shake correction processing is executed on a video image generated in this way, and each frame image is thereby corrected so that player appears at substantially the same position in all the frame images. Hereinafter, the video image to which the camera shake correction processing is executed will be referred to as a captured video image. In this embodiment, assume that the number of vertical and horizontal pixels of the frame images included in the generated captured video images are all the same.

In the following, a frame image having a frame number n (n=1, 2, 3,) is represented as a frame image (n). Further, a frame corresponding to the frame image (n) is represented as the n-th frame.

In this embodiment, swing analysis processing is performed on a captured video image. Subsequently, an analysis video image, which is obtained by overlaying an image indicating the result of the swing analysis processing onto the captured video image, is generated. The generated analysis video image is then stored in the storage unit 22 of the user terminal 10.

The user of the user terminal 10, such as the player and the operation user described above, can replay the analysis video image stored in the storage unit 22 by appropriately performing a predetermined operation.

Figure 2:
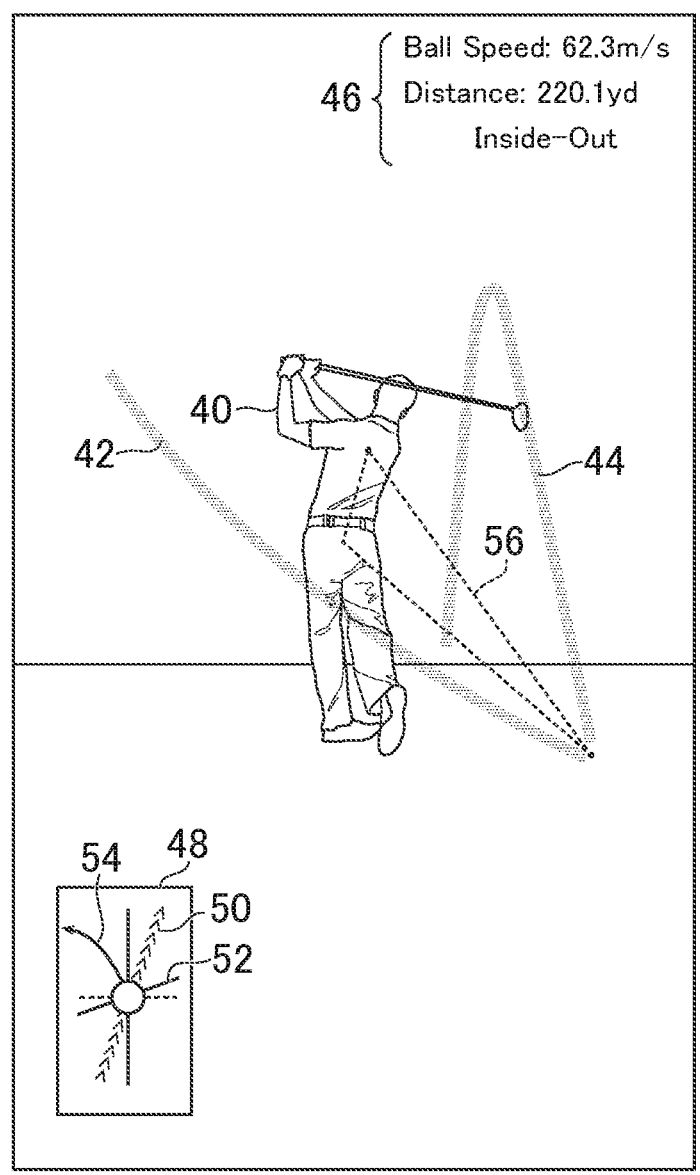
FIG. 2 is a diagram illustrating an example of a frame image included in an analysis video image.

FIG. 2 is a diagram illustrating an example of a frame image at the time of finish included in the analysis video image to be replayed. In the frame image shown in FIG. 2, a club head path effect image 42 representing a path of a club head and a ball path effect image 44 representing a path of a ball are overlaid on the frame image included in the captured video image in which the player 40 is captured.

On the upper right of the frame image shown in FIG. 2, analysis result information 46 is shown. In the example of FIG. 2, character strings indicating a ball speed, a flight distance, and a type of swing path, such as outside-in, inside-in, and inside-out, are shown as the analysis result information 46.

On the lower left of the frame image shown in FIG. 2, an impact image 48 is displayed in which a path of the club head, a direction of a face of a club at impact, and a curve direction of the ball are represented.

The impact image 48 shown in FIG. 2 includes a head moving direction image 50, a face orientation image 52, and a ball direction image 54. The head moving direction image 50 indicates, for example, a moving direction of a club head at impact. In the example of FIG. 2, the direction in which the arrows are aligned corresponds to the moving direction of the club head at impact. The face orientation image 52 indicates, for example, an orientation of the face of the club at impact. In the example of FIG. 2, the face orientation image 52 is a linear image, and the extending direction of the face orientation image 52 corresponds to the orientation of the face of the club at impact. The ball direction image 54 indicates, for example, a launch direction and a curve direction of the ball. In the ball direction image 54 according to the present embodiment, the direction perpendicular to the extending direction of the linear face orientation image 52 is shown as the launch direction of the ball.

The frame image shown in FIG. 2 also includes a V-zone image 56 indicating a V-zone through which the path of the club head desirably passes during downswing.

As described above, according to the present embodiment, the user of the user terminal 10 can check the analysis result of the golf swing performed by the player.

Hereinafter, the functions of the user terminal 10 according to the present embodiment and the processing executed by the user terminal 10 will be further described focusing on the swing analysis processing described above.

Figure 3:
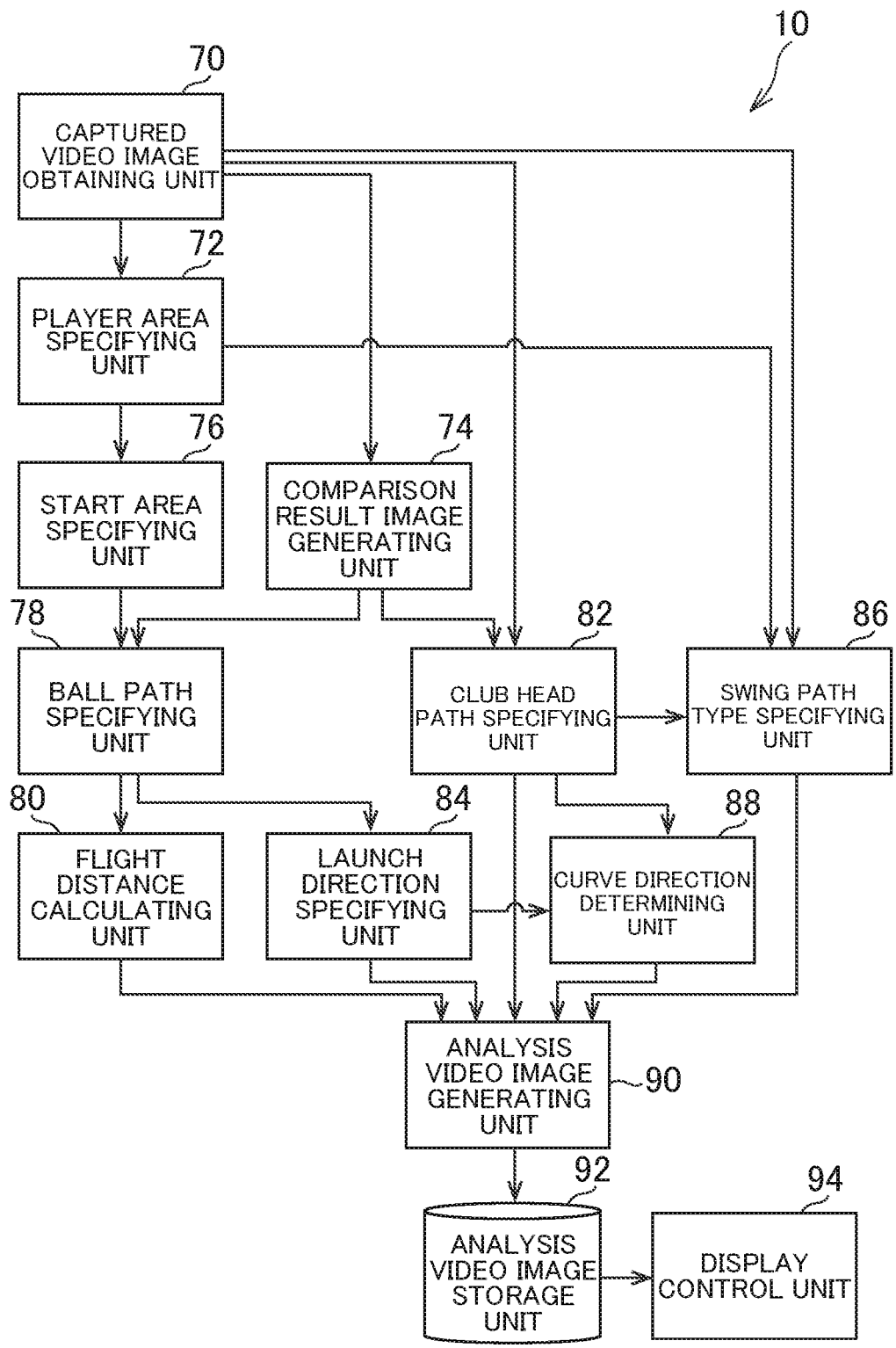
FIG. 3 is a functional block diagram showing an example of functions of the user terminal according to an embodiment of the present invention.

FIG. 3 is a functional block diagram showing an example of functions implemented in the user terminal 10 according to the present embodiment. In the user terminal 10 according to the present embodiment, all of the functions shown in FIG. 3 need not be implemented, and functions other than the functions shown in FIG. 3 may be implemented.

The user terminal 10 according to the present embodiment has a function as a swing analysis system for analyzing a golf swing. As shown in FIG. 3, the user terminal 10 according to the present embodiment functionally includes, for example, a captured video image obtaining unit 70, a player area specifying unit 72, a comparison result image generating unit 74, a start area specifying unit 76, a ball path specifying unit 78, a flight distance calculating unit 80, a club head path specifying unit 82, a launch direction specifying unit 84, a swing path type specifying unit 86, a curve direction determining unit 88, an analysis video image generating unit 90, an analysis video image storage unit 92, and a display control unit 94.

The captured video image obtaining unit 70, the player area specifying unit 72, the comparison result image generating unit 74, the start area specifying unit 76, the ball path specifying unit 78, the flight distance calculating unit 80, the club head path specifying unit 82, the launch direction specifying unit 84, the swing path type specifying unit 86, the curve direction determining unit 88, and analysis video image generating unit 90 are mainly implemented by the processor 20. The analysis video image storage unit 92 is mainly implemented by the storage unit 22. The display control unit 94 is mainly implemented by the processor 20 and the touch panel 26.

The functions described above may be implemented by executing programs that are installed in the user terminal 10, which is a computer, and includes commands corresponding to the above functions. The program may be supplied to the user terminal 10 via a computer-readable information storage medium, such as an optical disk, a magnetic disk, a magnetic tape, and a magneto-optical disk, or the Internet.

In the present embodiment, the captured video image obtaining unit 70 obtains a captured video image in which the player 40 making a golf swing is captured, for example.

Here, as described above, a captured video image on which the camera shake correction processing is executed may be obtained.

As shown in FIG. 2, the captured video image may be a video image in which the player 40 is captured from one direction. The captured video image may be a video image in which the player 40 is viewed from rearward of a target direction of the ball.

As described above, assume that a captured video image captured at a predetermined frame rate (e.g., 60 fps) is obtained in the present embodiment.

Figure 4:
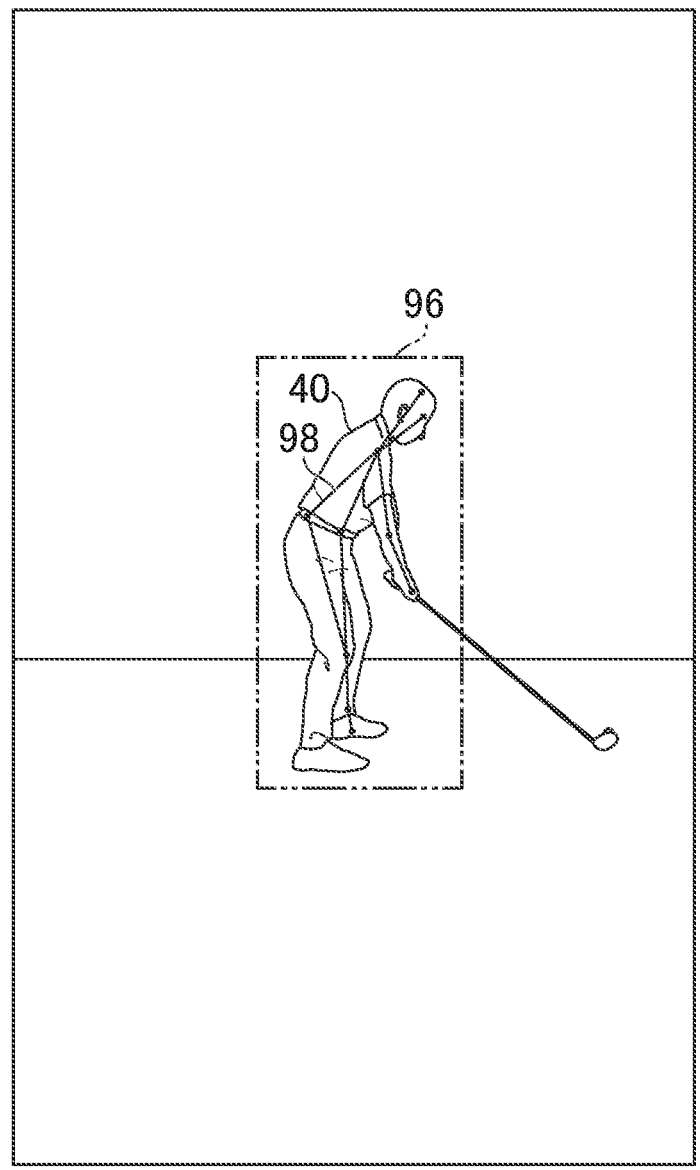
FIG. 4 is a diagram illustrating an example of a player area.

In the present embodiment, for example, the player area specifying unit 72 specifies a player area 96, in which the player 40 is captured in the frame image included in the captured video image as shown in FIG. 4.

For example, a trained machine learning model, such as OpenPose, may be installed in the user terminal 10 according to the present embodiment. The player area specifying unit 72 may use such a trained machine learning model and whereby specify positions of nodes and links of a skeleton model 98, which represents the skeleton (bones) of the player 40 in the frame image. The positions of the plurality of nodes included in the skeleton model 98 shown in FIG. 4 are respectively associated with the positions of the body parts of the player 40, such as the shoulders and the waist.

The player area specifying unit 72 may specify a rectangular area as the player area 96, where a position, a shape, and a size of the rectangular area are specified based on the skeleton model 98. For example, an area obtained by enlarging a rectangular area circumscribing around the skeleton model 98 at a predetermined magnification without changing the position of the center may be specified as the player area 96.

The player area 96 may be specified based on one representative frame image. Alternatively, the player area 96 may be specified based on a plurality of frame images. In this case, an area representing the rectangular areas specified for a plurality of frame images, such as the common area or the average area of the rectangular areas specified for the frame images, may be specified as the player area 96.

For example, when a person other than the player is included in the captured video image, a plurality of candidates of the player area 96 may be specified. In this case, any one of the candidates may be specified as the player area 96 based on a given condition, such as a size of the area, a distance from the center of the frame image, and a ratio of the height to the width of the area.

Figure 5:
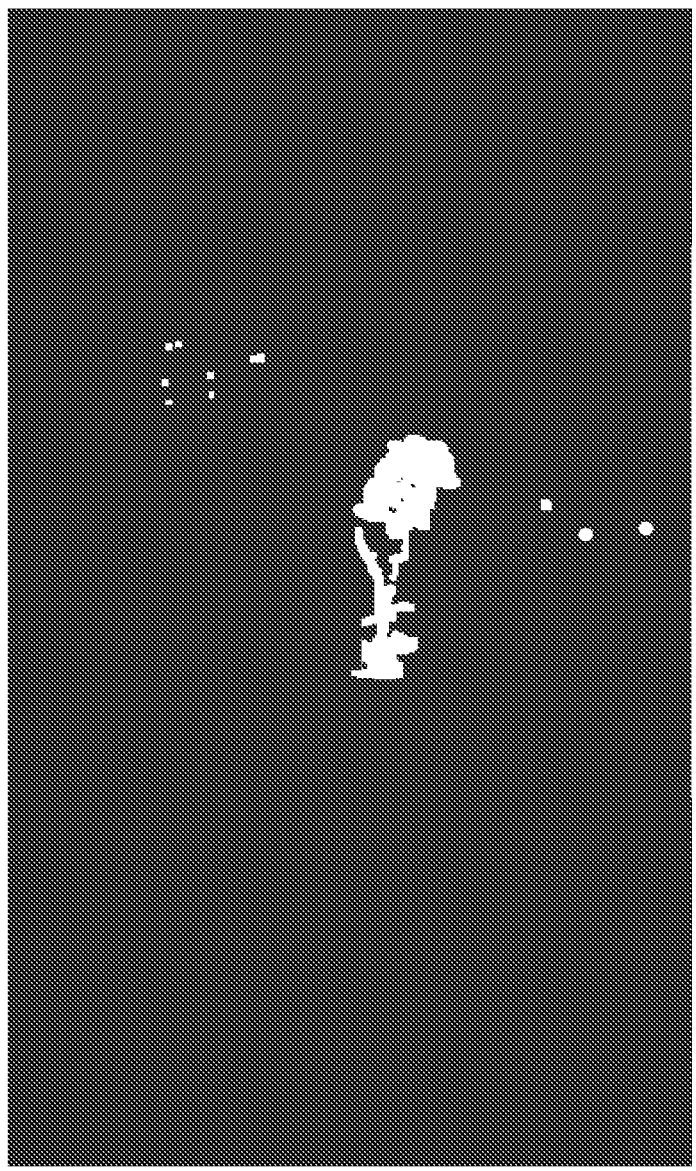
FIG. 5 is a diagram illustrating an example of a comparison result image.

In this embodiment, for example, the comparison result image generating unit 74 uses an image differencing method based on the captured video image so as to generate a comparison result image shown in FIG. 5.

In the present embodiment, a comparison result image is generated so as to be associated with each of the frame images included in the captured video image. For example, a comparison result image (n) is generated for the frame image (n) as a corresponding comparison result image.

For example, the comparison result image generating unit 74 may smooth a predetermined number of consecutive frame images, e.g., 20 frames, so as to generate a comparison image. For example, 20 frame images from the frame image (n−20) to the frame image (n−1) included in the captured video image may be smoothed to generate a comparison image (n). For example, the comparison image (n) may be generated in which average values of pixel values of respective pixels in the frame images from the frame image (n−20) to the frame image (n−1) are set to the pixel values of the corresponding pixels.

The comparison result image generating unit 74 calculates the difference between the pixel values of the pixels in the frame image (n), which is the next frame image of the predetermined number of frame images described above, and the pixel values of the corresponding pixels in the comparison image (n) described above. The comparison result image generating unit 74 generates a comparison result image (n) indicating whether a difference between a pixel value of each pixel in the frame image (n) and a pixel value of a corresponding pixel in the comparison image (n) is equal to or greater than a predetermined value. In the comparison result image shown in FIG. 5, the pixel having the difference of the pixel value equal to or greater than the predetermined value is represented in white, and the pixel having the difference of the pixel value less than the predetermined value is represented in black. Hereinafter, the pixel having the difference of pixel value equal to or greater than the predetermined value, that is, the pixel represented in white in the comparison result image in FIG. 5, will be referred to as a change pixel.

In the present embodiment, when the comparison image is generated based on 20 frame images as described above, comparison result images corresponding to the frame images subsequent to the frame image 21 are generated.

Figure 6:
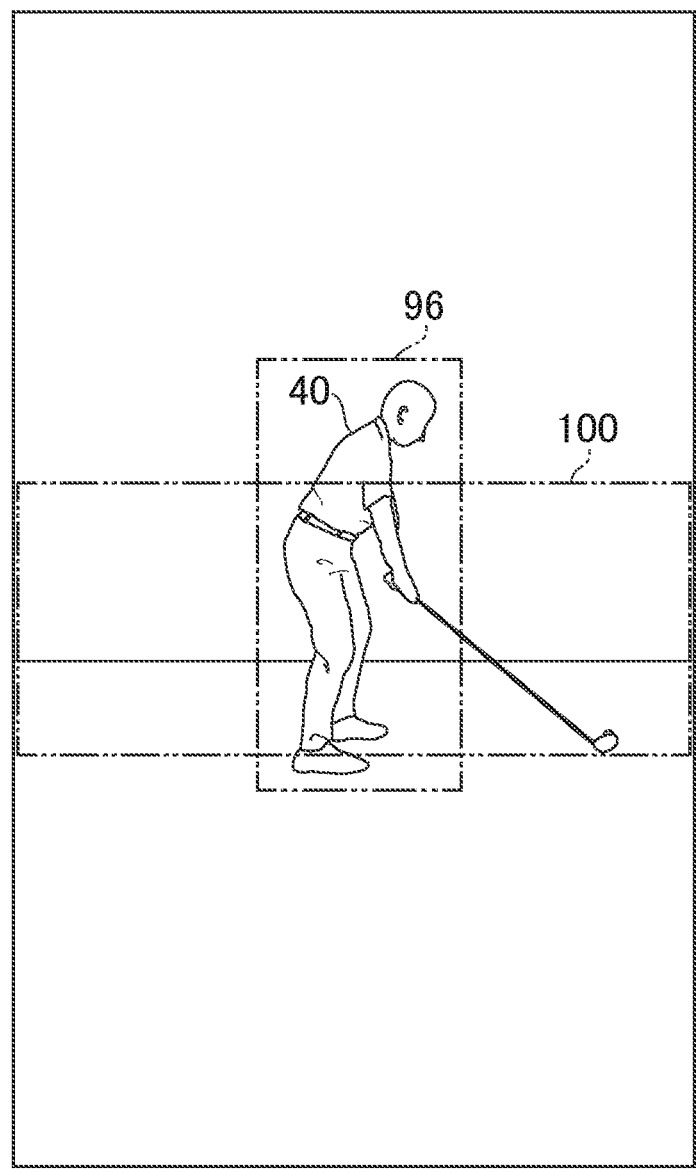
FIG. 6 is a diagram illustrating an example of a start area.

In the present embodiment, the start area specifying unit 76 specifies, for example, a start area 100 shown in FIG. 6 used for specifying a path of the ball by the ball path specifying unit 78 described later.

The start area 100 according to the present embodiment is, for example, a rectangular area uniquely specified based on the player area 96. For example, the position of the left side of the start area 100 may be the same as the position of the left side of the frame image, and the position of the right side of the start area 100 may be the same as the position of the right side of the frame image. Further, the position of the upper side of the start area 100 may be the position that is 30% lower than the upper side of the player area 96 by the length in the vertical direction of the player area 96. Further, the position of the lower side of the start area 100 may be the same as the position of the lower side of the player area 96 or the position passing under the foot of the player 40. This method is only an example of methods of specifying the start area 100, and other methods may be used for specifying the start area 100.

In the present embodiment, for example, the ball path specifying unit 78 specifies a path of a ball in a captured video image based on the captured video image.

In the present embodiment, a ball path is specified as a list in which positions of the ball in a plurality of frame images included in the captured video image are associated with each other. Hereinafter, such a list is referred to as a path list.

In the following, referring to FIGS. 7 to 12, an example of processing for specifying a ball path by the ball path specifying unit 78 will be described.

As described above, assume that a comparison result image associated with a frame image subsequent to the frame image 21 is generated. In this case, at least one pixel block of changed pixels within a predetermined number of pixels and in a predetermined range is specified for the comparison result image subsequent to the frame image 21. For these pixel blocks, a position of the representative point (e.g., the center) is specified as a candidate ball position.

Figure 7:
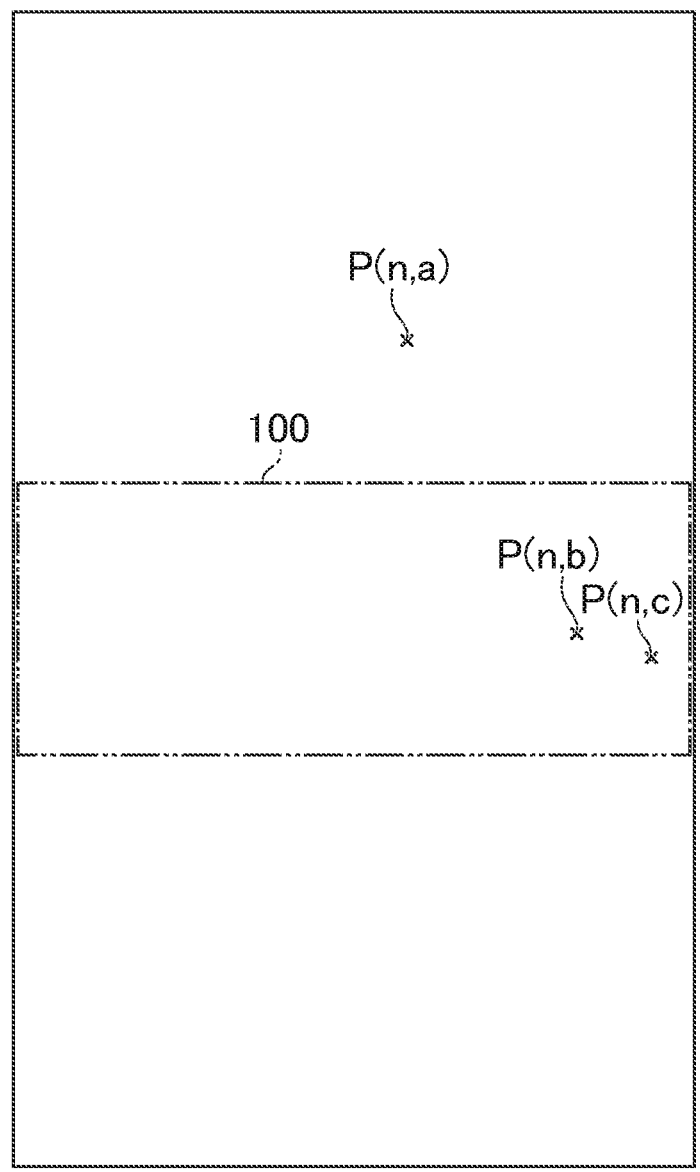
FIG. 7 is a diagram illustrating an example of a candidate ball position.

Here, for example, assume that the candidate ball position is not specified up to the comparison result image (n−1), and three candidate ball positions P(n, a), P(n, b), and P(n, c) shown in FIG. 7 are specified in the comparison result image (n).

Subsequently, the candidate ball positions are narrowed down to the candidate ball position to be the first element of candidates of the path list (hereinafter referred to as path list candidates). For example, the candidate ball position outside the start area 100 is excluded from the candidate ball position. In this manner, P(n,a) is excluded from the candidate ball position to be the first element, and the candidate ball positions are narrowed down to P(n,b) and P(n,c) as the candidate ball position to be the first element.

Figure 8:
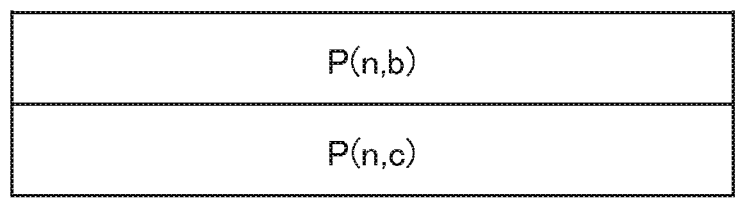
FIG. 8 is a diagram illustrating an example of a path list candidate.

In this case, as shown in FIG. 8, P(n,b) and P(n,c), each having one element, are specified as the path list candidates.

Figure 9:
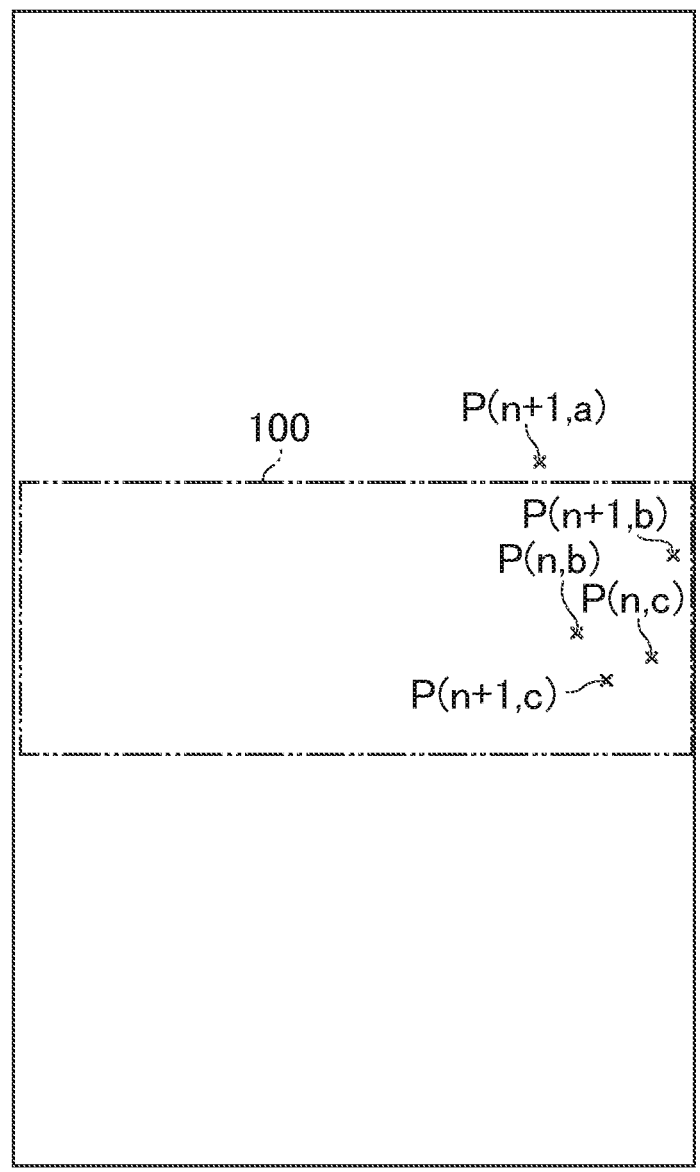
FIG. 9 is a diagram illustrating an example of a candidate ball position.

Assume that three candidate ball positions P(n+1, a), P(n+1, b), and P(n+1, c) shown in FIG. 9 are specified in the comparison result image (n+1).

In addition to these candidate ball positions, FIG. 9 also shows P(n, b) and P(n, c) that are not excluded from the candidate ball positions.

In this case, P(n+1,a) outside the start area 100 is excluded from the candidate ball position to be the first element. On the other hand, the candidate ball positions to be the first element are narrowed down to P(n+1,b) and P(n+1,c).

In the situation where the path list candidates already exist, the candidate ball position associated with the existing path list candidate is also specified.

For example, the candidate ball position to be associated with P(n,b) is specified from among P(n+1,a), P(n+1,b), and P(n+1,c). When a predetermined condition is satisfied, for example, the length from P(n,b) to a position is longer than a predetermined length, the length from P(n,b) to a position is shorter than a predetermined length, or a position is located lower than P(n,b), such a position is excluded from the candidate ball position to be associated with P(n,b). For example, P(n+1,c) is located below P(n,b), and thus excluded from the candidate ball position. The candidate ball positions to be associated with P(n,b) are narrowed down to P(n+1,a) and P(n+1,b).

Similarly, the candidate ball position to be associated with P(n,c) is specified from among P(n+1,a), P(n+1,b), and P(n+1,c). Here, for example, P(n+1,c) is located below P(n,c), and thus excluded from the candidate ball position. The candidate ball positions to be associated with P(n,c) are narrowed down to P(n+1,a) and P(n+1,b).

As shown in FIG. 10, the path list candidates are added to the list. In the above example, P(n+1,b), P(n+1,c), P(n,b)-P(n+1,a), P(n,b)-P(n+1,b), P(n,c)-P(n+1,a), and P(n,c)-P(n+1,b) are added to the path list candidates. FIG. 10 also shows the path list candidate including a plurality of candidate ball positions associated with each other. For example, in FIG. 10, the path list candidate including the element P(n,b) and the element P(n+1,a) is shown as P(n,b)-P(n+1,a). P(n,b) and P(n,c) shown in FIG. 8 are not overwritten and also left in the path list candidates.

Figure 11:
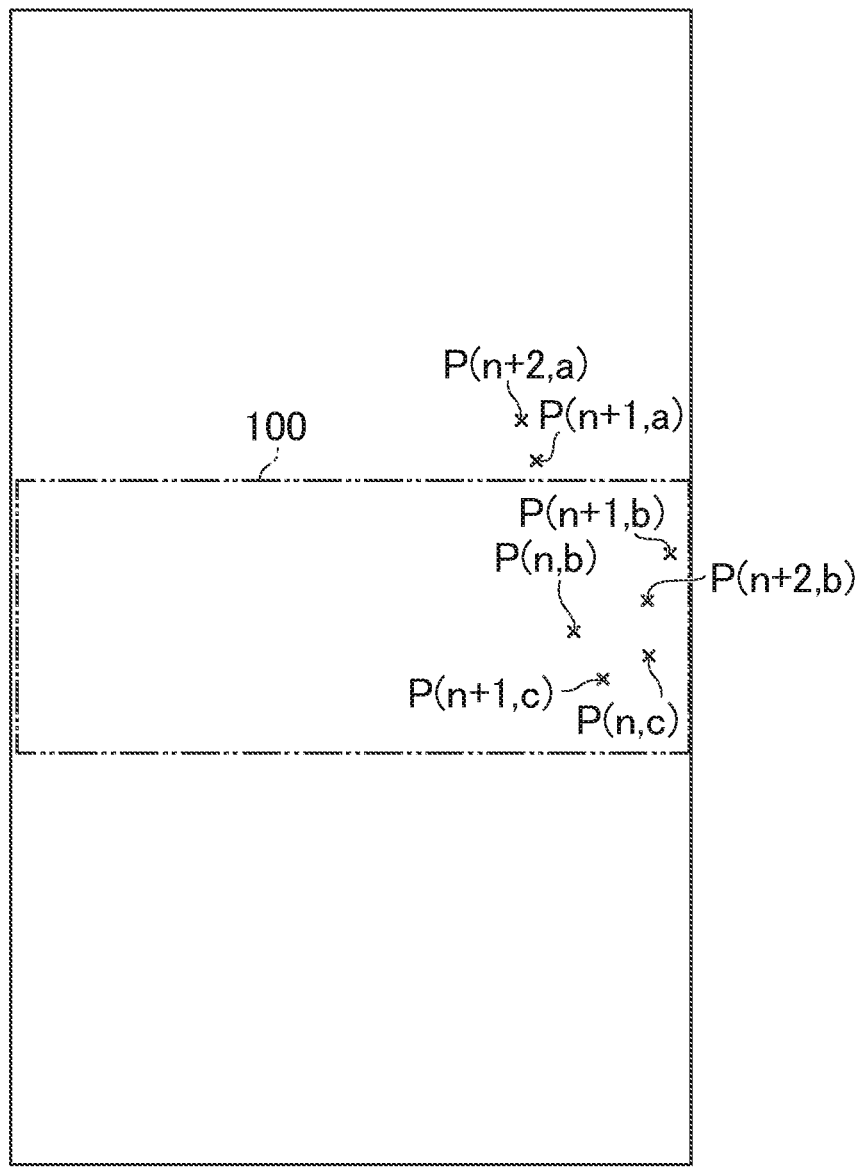
FIG. 11 is a diagram illustrating an example of a candidate ball position.

Assume that two candidate ball positions P(n+2, a) and P(n+2, b) shown in FIG. 11 are specified in the comparison result image (n+2).

In addition to these candidate ball positions, FIG. 11 also shows candidate ball positions that are not excluded. Of these candidate ball positions, P(n+2,a), which is outside the start area 100, is excluded from the candidate ball position to be the first element. On the other hand, the candidate ball positions for the starting point are narrowed down to P(n+2,b).

As described above, the candidate ball position associated with the path list candidate having one element is specified. For example, P(n+2,b) is excluded from the candidate ball position associated with P(n,c) because the length from P(n,c) to P(n+2,b) is less than a predetermined length.

Further, P(n+2,a) is excluded from the candidate ball position associated with P(n+1,c) because the length from P(n+1,c) to P(n+2,a) is longer than the predetermined length.

Subsequently, the candidate ball position associated with the path list candidate having a plurality of elements is also specified. In this case, when a candidate ball position satisfies predetermined conditions, such a candidate ball position may be excluded from the candidate ball position associated with the path list candidate. For example, the predetermined conditions include the cases where the length from the candidate ball position that is the last element of the path list candidate is longer than the predetermined length, the length from the candidate ball position that is the last element of the path list candidate is shorter than the predetermined length, and the position is lower than the candidate ball position that is the last element of the path list candidate.

In addition to these conditions, those satisfying predetermined conditions relating to the path list candidate including a plurality of elements may also be excluded from the candidate ball positions associated with path list candidates. For example, the conditions include the cases where the angle of the path is abruptly changed (curved more than a predetermined angle), the speed of the path is abruptly changed (shorter or longer than a predetermined length), the direction of the path is changed (the path toward the right is directed to the left, or the path toward the left is directed to the right).

In the example of FIG. 11, the angle of the path of P(n+2,a) is abruptly changed with respect to the path connecting P(n,b) with P(n+1,b), and thus excluded from the candidate ball positions associated with P(n,b)-P(n+1,b). Further, the speed of P(n+2,a) is rapidly decreased with respect to the path connecting P(n,c) with P(n+1,a), and thus P(n+2,a) is excluded from the candidate ball position associated with P(n,c)-P(n+1,a).

In this manner, as shown in FIG. 12, five path list candidates are added, for example. Here, similarly to P(n,b)-P(n+2, a) and P(n, c)-P(n+2, a), the frames respectively corresponding to the two elements associated with each other included in the path list candidates may not be continuous. However, for example, the candidate ball position that is separated from the frame corresponding to the last element of the path list candidates by a predetermined number of frames (e.g., four frames) or more may be excluded from the candidate ball positions associated with the path list candidates.

As described above, in the present embodiment, a plurality of path list candidates are specified. From among these path list candidates, the candidate having the largest number of elements (candidate ball positions) included in the path list candidates is specified as the path list. Hereinafter, the candidate ball position, which is an element included in the specified path list, will be referred to as a path ball position.

Here, for example, the path list may be specified according to other criteria. For example, the path list candidate representing the path closest to the straight line may be specified as a path list.

As described above, path ball positions for approximately frames immediately after impact are usually specified, although the path ball positions for all frames up to the landing point are not specified.

The ball path specifying unit 78 executes straight line estimation, for example, based on path ball positions in the respective frames specified as described above, thereby specifying the path of the ball represented by the two-dimensional coordinate system of the captured video image.

Subsequently, the specified path is extended downward by extrapolation, and the frame number corresponding to the timing at which the position in the vertical direction in the frame image is at a predetermined position is specified as the frame number corresponding to the timing of impact. In this embodiment, frame numbers are specified in units finer than integers, for example, 103.195. Hereafter, the frame corresponding to the frame number specified in this manner is referred to as an impact frame.

The ball path specifying unit 78 then specifies the position of the ball before being hit, hereinafter referred to as an initial position. For example, the ball path specifying unit 78 specifies frame images in the frames immediately before and after the impact frame. For example, when the frame number of the impact frame is 103.195, the frame having the frame number 103 corresponds to the frame immediately before the impact frame, and the frame having the frame number 104 corresponds to the frame immediately after the impact frame. In this case, the frame image (103) is specified as the frame image in the frame immediately before the impact frame. The frame image (104) is specified as the frame image in the frame immediately after the impact frame.

The ball path specifying unit 78 compares these two frame images, thereby detecting an object that exists in the frame image immediately before the impact and does not exist in the frame image immediately after the impact. The ball path specifying unit 78 specifies the position of the detected object as the initial position.

When the initial position cannot be specified in this manner, the ball path specifying unit 78 may detect a shaft from the frame image of the frame at address (e.g., the fifth frame). Subsequently, the ball path specifying unit 78 may specify, as the initial position, the position of the intersection of the line obtained by extending the detected shaft and the line extending in the left-right direction at a position 10% upper than the lower side of the player area 96 by the length of the player area 96 in the vertical direction.

When specifying the path ball position based on the comparison result image, the initial position is a position of the ball that is placed and not moving, and thus cannot be detected because it is not a changed pixel. Before being hit, the ball is highly likely to be hidden by the club head. In such a condition, the initial position can be also specified as described above in the present embodiment.

In this embodiment, the flight distance calculating unit 80 calculates, for example, a head speed, a ball speed, and a flight distance of the shot performed by the player 40.

Figure 13:
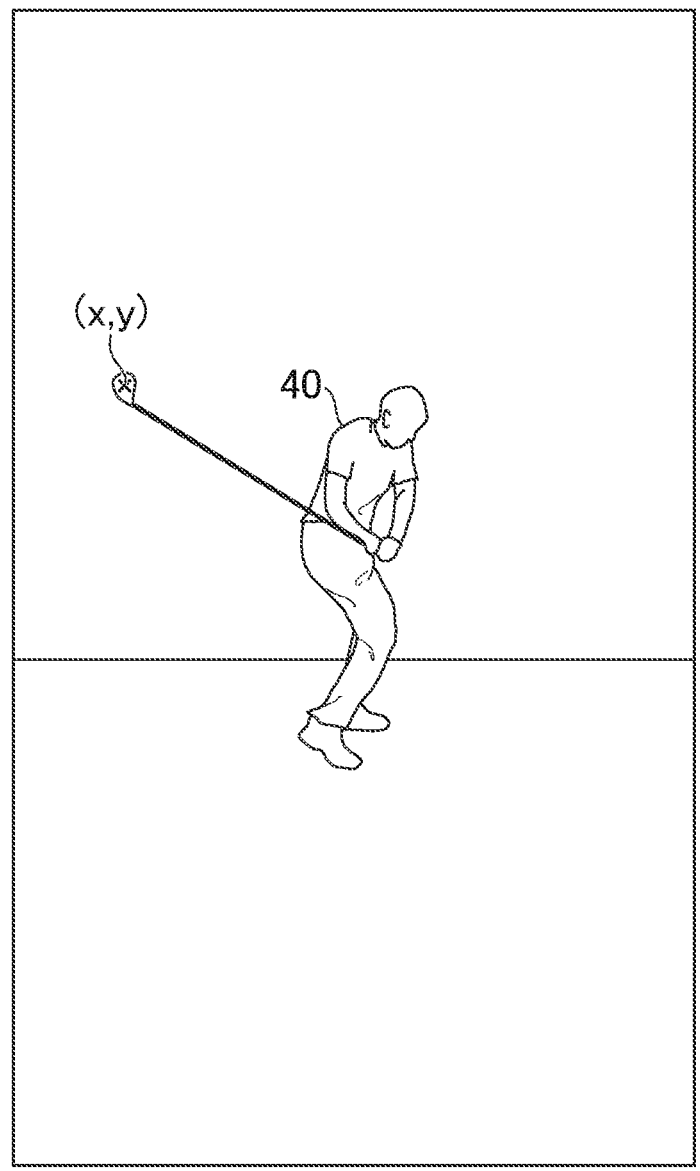
FIG. 13 is a diagram illustrating an example of a top position frame image.
Figure 14:
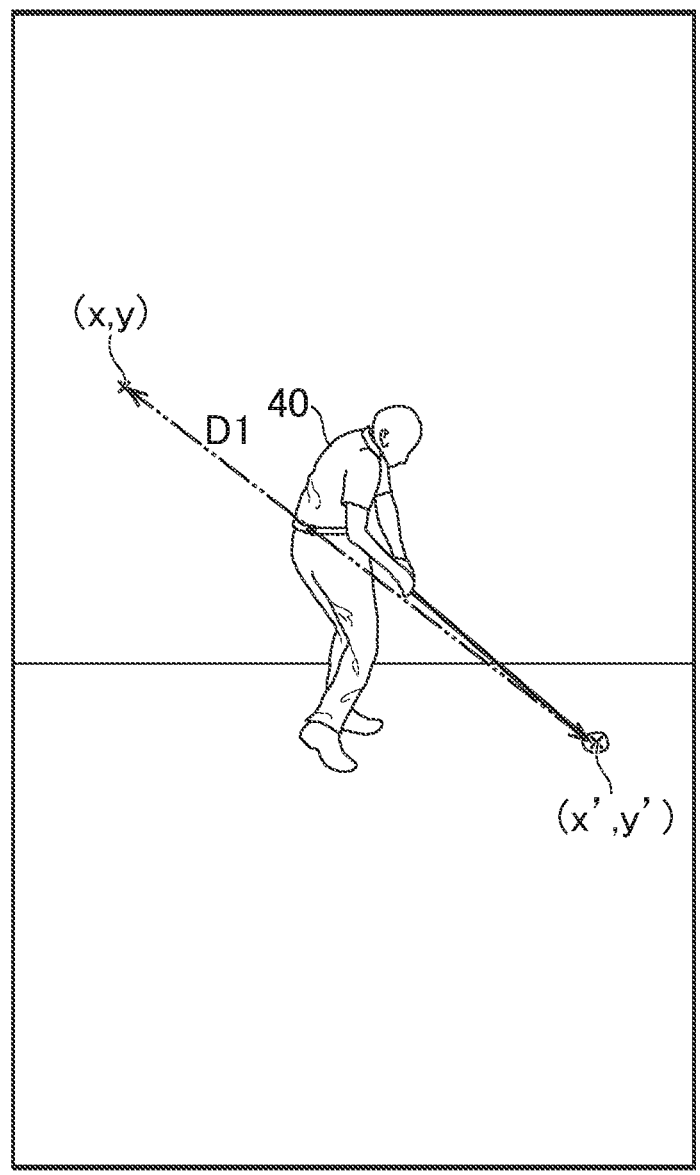
FIG. 14 is a diagram illustrating an example of an impact frame image.

For example, the flight distance calculating unit 80 extracts a top position frame image in which the club head appears leftmost and an impact frame image in which the club head appears rightmost from the frame images included in the captured video image. FIG. 13 is a diagram illustrating an example of the top position frame image. FIG. 14 is a diagram illustrating an example of the impact frame image.

The flight distance calculating unit 80 then specifies the coordinate values (x, y) of the club head in the top position frame image and the coordinate values (x', y') of the club head in the impact frame image, which are expressed in the two-dimensional image coordinate system of the frame image. The flight distance calculating unit 80 calculates a head moving distance D1 in the image based on the coordinate values (x, y) and (x', y'). Here, D1 is the square root of the sum of the square of (x'−x) and the square of (y'−y), for example. In the frame image, the rightward direction is the positive direction of the x-axis, and the downward direction is the positive direction of the y-axis.

The flight distance calculating unit 80 calculates a head moving time T1 (seconds) by multiplying the difference between the frame number of the impact frame and the frame number of the top position frame image by the capturing time interval (e.g., 1/60 second).

The flight distance calculating unit 80 calculates a head speed S (in meters per second) by dividing the value D1 by the value T1.

The flight distance calculating unit 80 calculates a provisional ball initial speed V (in meters per second) by multiplying the head speed S by a predetermined provisional smash factor of 1.25.

The flight distance calculating unit 80 calculates a provisional total flight distance D2 (yards) by multiplying the provisional ball initial speed V by a predetermined factor of 4×0.8×1.0936.

The flight distance calculating unit 80 specifies, for each frame image, a vertical angle and a left-right angle of a ball in a camera coordinate system in a frame based on coordinate values of a path ball position in the frame image, which are expressed in the two-dimensional image coordinate system of the frame image. Here, coordinate values of a path ball position for a frame image (n) are expressed as (x1 (n), y1 (n)), the vertical angle in the camera coordinate system in the frame corresponding to the frame image (n) is expressed as a1 (n), and the left-right angle is expressed as a2 (n). Here, the vertical angle in the camera coordinate system is an angle in the vertical direction when looking at the ball from the camera unit 28 with reference to a predetermined direction, and the left-right angle is an angle in the left-right direction when looking at the ball from the camera unit 28 with reference to a predetermined direction.

In the present embodiment, as described above, the position and inclination of the user terminal 10 is adjusted, and thus the two-dimensional coordinate values of the ball position can be associated with the vertical angle and the left-right angle one-to-one. As such, in this embodiment, for example, the data indicating a conversion expression or a conversion table previously stored in the flight distance calculating unit 80 is referred to, and the vertical angle and the left-right angle can be thereby uniquely specified based on the two-dimensional coordinate values of the ball position.

Similarly, the flight distance calculating unit 80 specifies the vertical angle a1' and the left-right angle a2' when viewing the ball at the initial position from the camera unit 28 based on the coordinate values (x0, y0) of the initial position of the ball.

The flight distance calculating unit 80 specifies a parabola representing the path of the ball in the three-dimensional space based on the calculated provisional total flight distance D2, where the parabola is associated with the provisional total flight distance D2. In this embodiment, assume that a provisional total flight distance D2 and a shape of parabola are associated with each other in advance. The flight distance calculating unit 80 calculates three-dimensional coordinate values of the position of the ball in the three-dimensional space along the parabola corresponding to the vertical angle and the left-right angle. Here, for example, the three-dimensional coordinate values (x2 (n), y2 (n), z2 (n)) are calculated for the frame corresponding to the frame image (n) based on the parabola, the vertical angle a1 (n), and the left-right angle a2 (n) described above.

In the present embodiment, for each frame, three-dimensional coordinate values of a position of a ball are calculated with the three-dimensional coordinate values corresponding to the vertical angle a1' and the left-right angle a2' of the initial position of the ball as the origin.

Here, the position and the inclination of the user terminal are also adjusted, and thus a combination of parabola, vertical angle, and left-right angle can be associated with the three-dimensional coordinate values of the position of the ball one-to-one. As such, in this embodiment, for example, the data indicating the conversion expression or the conversion table previously stored in the flight distance calculating unit 80 is referred to, and the three-dimensional coordinate values of the ball position can be thereby uniquely specified based on the parabola, the vertical angle, and the left-right angle.

The flight distance calculating unit 80 solves a binary equation in which two of the three-dimensional coordinate values of the position of the ball calculated as described are input and the left-right angle and the elevation angle are unknown numbers, thereby calculating the left-right angle and the elevation angle corresponding to the input.

The flight distance calculating unit 80 selects a pair of entered three-dimensional coordinate values in various patterns, and calculates a combination of a left-right angle value and an elevation angle value for each pattern. The flight distance calculating unit 80 then determines the average value of the elevation angle values calculated in the various patterns to be the elevation angle a3 for the entire flight path of the ball.

The flight distance calculating unit 80 calculates, for each frame, a left-right angle when the calculated elevation angle a3 is a fixed value based on the three-dimensional coordinate values of the position of the ball.

Figure 15:
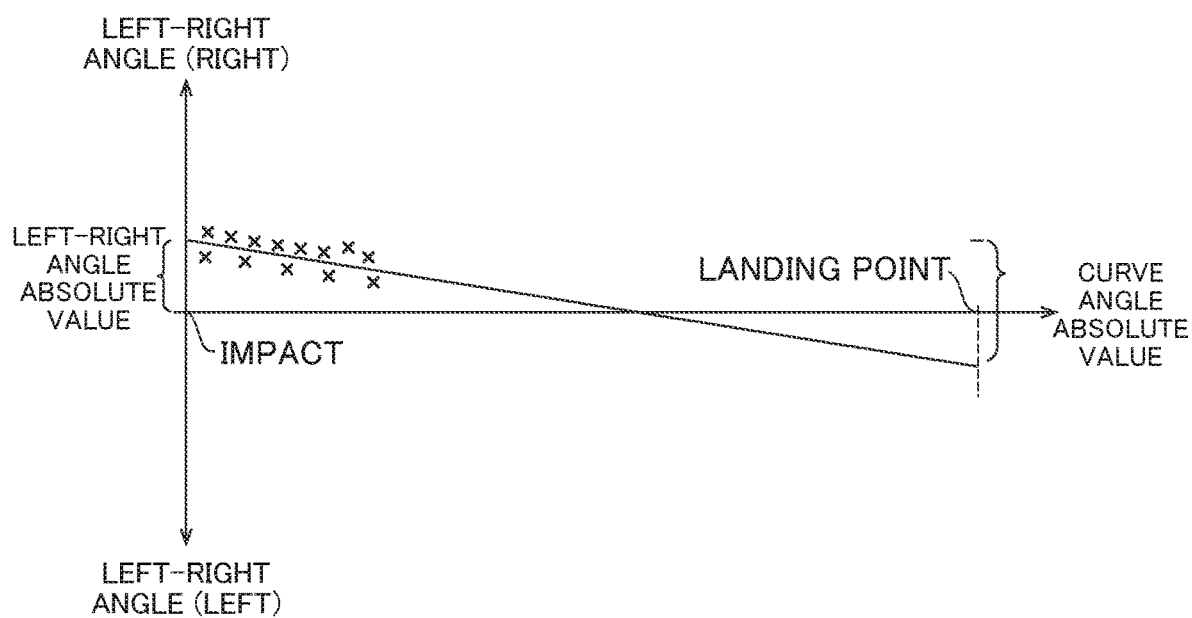
FIG. 15 is a diagram illustrating an example of a left-right angle absolute value and a curve angle absolute value.

As shown in FIG. 15, the flight distance calculating unit 80 calculates the initial value and the final value (the left-right angle when the ball lands) of the left-right angle using regression analysis. Here, for example, the left-right angle at impact is calculated as the initial value of the left-right angle. The left-right angle at the landing point specified based on the parabola described above is calculated as the final value of the left-right angle.

The flight distance calculating unit 80 calculates a smash factor by a mathematical expression of 1.33×(1−0.01×elevation angle deviation)×cos (left-right angle absolute value+ curve angle absolute value).

Here, the elevation angle deviation indicates the absolute value of the difference between the calculated elevation angle a3 and the value 14. The left-right angle absolute value indicates the absolute value of the value calculated as the initial value of the left-right angle. Further, the curve angle absolute value indicates the absolute value of the value obtained by subtracting the value calculated as the initial value of the left-right angle from the value calculated as the final value of the left-right angle.

The flight distance calculating unit 80 calculates the initial ball speed by multiplying the smash factor thus calculated by the calculated head speed S.

The flight distance (yard) is then calculated by multiplying the calculated initial ball speed by 4×0.8×1.0936.

The methods of calculating the flight distance etc. are not limited to the above-described methods.

In the present embodiment, the club head path specifying unit 82 specifies a club head path in a captured video image based on the captured video image, for example.

Figure 16:
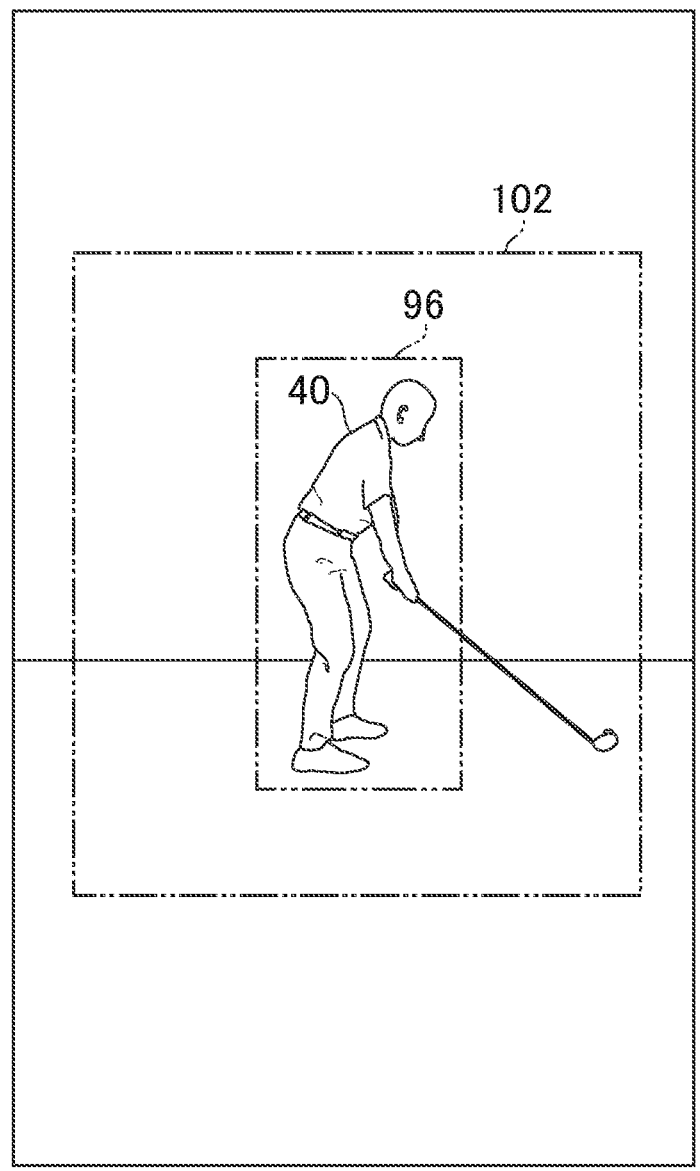
FIG. 16 is a diagram illustrating an example of a head detecting area.

For example, the club head path specifying unit 82 specifies a head detecting area 102 shown in FIG. 16. Here, the position, shape, and size of the head detecting area 102 are uniquely specified based on the position, shape, and size of the player area 96 according to predetermined rules, for example. In the example of FIG. 16, the head detecting area 102 is shown as an area in which the center position is the same as the player area 96, the length of the left-right direction is three times the length of the player area 96, and the length of the vertical direction is twice the length of the player area 96.

The club head path specifying unit 82 specifies a position of the club head in the head detecting area 102 in the plurality of frame images included in the captured video image. Here, for example, the area in which the club head is captured in the frame images up to the impact frame may be specified. When specifying the area in which the club head is captured, the comparison result image described above may be used. For example, in the head detecting area 102, the area corresponding to a pixel block of changed pixels within a predetermined number of pixels may be specified as an area in which the club head is captured. The club head path specifying unit 82 may specify a position of a representative point (e.g., the center) in each specified area as the position where the club head is captured (hereinafter, referred to as a club head position).

Then, the club head path specifying unit 82 may specify the path of the club head based on the plurality of specified club head positions. For example, the club head path specifying unit 82 may use cubic Bezier curves to interpolate the specified club head positions for each frame to specify, as the path of the club head, the movement path L1 of the club head having a smooth line interpolated between frames as shown in FIG. 17.

The club head path specifying unit 82 may specify a moving direction of the club head at impact based on the captured video image. For example, the club head path specifying unit 82 may specify the position of the club head in the frame immediately before the impact frame on the movement path L1 of the club head specified as described above. Further, the club head path specifying unit 82 may specify the position of the club head in the frame immediately after the impact frame on the movement path L1 of the club head specified as described above.

Figure 17:
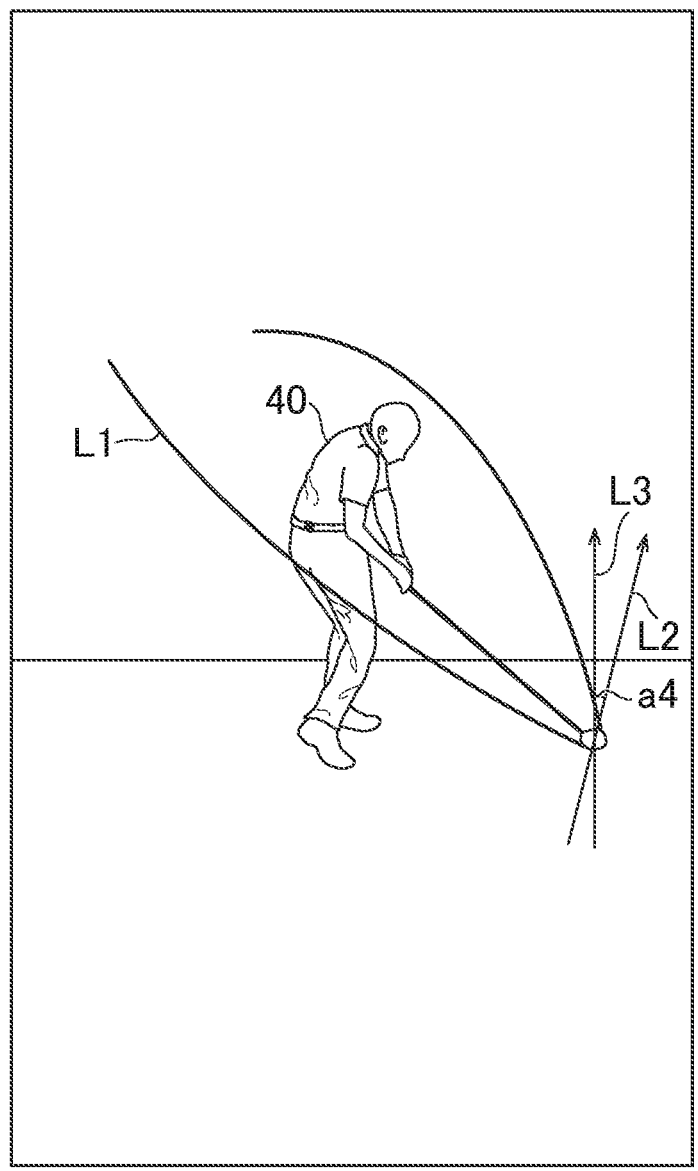
FIG. 17 is a diagram illustrating an example of a club path angle.

The club head path specifying unit 82 may specify a line L2, as illustrated in FIG. 17, that connects the position of the club head in the frame immediately before the impact frame with the position of the club head in the frame immediately after the impact frame.

The club head path specifying unit 82 may specify the angle of the moving direction of the club head at impact, which is represented by the two-dimensional image coordinate system of the captured video image, with respect to a predetermined reference direction. As shown in FIG. 17, for example, the club head path specifying unit 82 may specify the angle formed between the line L3 extending in the vertical direction in the frame image and the line L2 described above along the moving direction of the club head as the angle a4 of the moving direction of the club head at impact. In the following, the angle of the moving direction of the club head at impact specified in this manner will be referred to as a club path angle. In the present embodiment, the counterclockwise direction is the positive direction for the club path angle. That is, the value of the club path angle a4 shown in FIG. 17 is negative.

In this embodiment, for example, the launch direction specifying unit 84 specifies a launch direction of the ball in a captured video image based on the captured video image.

Figure 18:
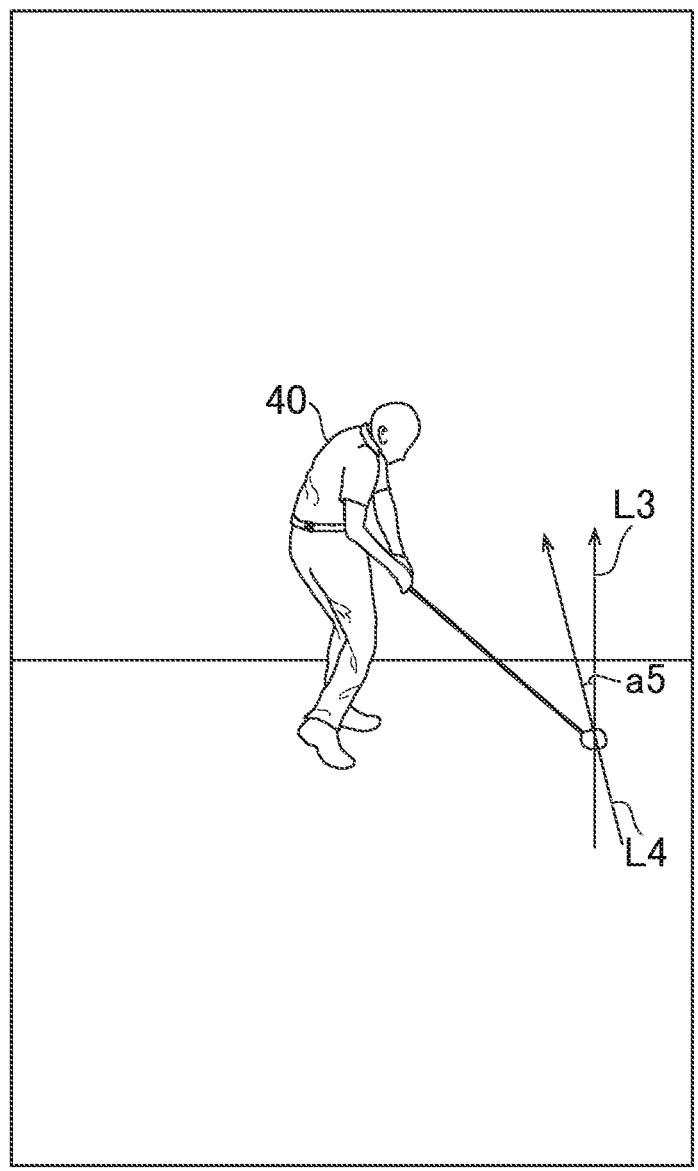
FIG. 18 is a diagram illustrating an example of a launch angle.

The launch direction specifying unit 84 specifies the launch direction based on, for example, the positions of the ball in the frame images included in the captured video image. For example, the launch direction specifying unit 84 may specify the launch direction based on the ball path specified by the ball path specifying unit 78. For example, the launch direction may be specified based on the path ball positions in the frame images in the predetermined number of frames immediately after the impact frame (e.g., five frames) specified by the ball path specifying unit 78. For example, as illustrated in FIG. 18, the direction of the approximate line L4 along the path ball positions in the frame images in the predetermined number of frames immediately after the impact frame may be specified as the launch direction.

The launch direction specifying unit 84 may specify an angle of the launch direction with respect to a predetermined reference direction, which is represented by the two-dimensional image coordinate system of the captured video image. For example, as shown in FIG. 18, the angle formed between the line L3 extending in the vertical direction in the frame image and the line L4 along the launching direction may be specified as a launch angle a5. In the present embodiment, the counterclockwise direction is the positive direction for the launch angle. That is, the value of the launch angle a5 shown in FIG. 18 is positive.

The launch direction specifying unit 84 specifies an orientation of the face of the club at impact based on the specified launch direction.

For example, when the absolute value of the launch angle a5 is less than a predetermined value, the orientation of the face may be specified as square. When the absolute value of the launch angle a5 is the predetermined value or more and the value of the launch angle a5 is positive, the orientation of the face may be specified as being closed. Further, when the absolute value of the launch angle a5 is the predetermined value or more and the value of the launch angle a5 is negative, the orientation of the face may be specified as being open.

In the present embodiment, the swing path type specifying unit 86 specifies, for example, a type of a swing path performed by the player 40. Here, for example, the swing path type specifying unit 86 specifies whether the swing path of the swing performed by the player 40 is inside-out, inside-in, or outside-in.

The swing path type specifying unit 86 may specify a type of the swing path based on the club path angle a4 described above, for example.

For example, when the absolute value of the club path angle a4 is less than a predetermined value, the type of the swing path may be specified as inside-in. When the absolute value of the club path angle a4 is the predetermined value or more and the value of the club path angle a4 is positive, the type of swing path may be specified as outside-in. Further, when the absolute value of the club path angle a4 is the predetermined value or more and the value of the club path angle a4 is negative, the type of swing path may be specified as inside-out.

The method of specifying the type of swing path by the swing path type specifying unit 86 is not limited to the method described above.

For example, the swing path type specifying unit 86 may specify a position of a predetermined body part of the player 40 in a frame image at address based on the captured video image. Here, for example, the swing path type specifying unit 86 may specify a position of a predetermined body part of the player 40 in a frame image having a predetermined frame number, e.g., the frame image (5). For example, the swing path type specifying unit 86 may specify the position of the shoulder of the player 40 shown in the skeleton model 98 specified by the player area specifying unit 72.

Figure 19:
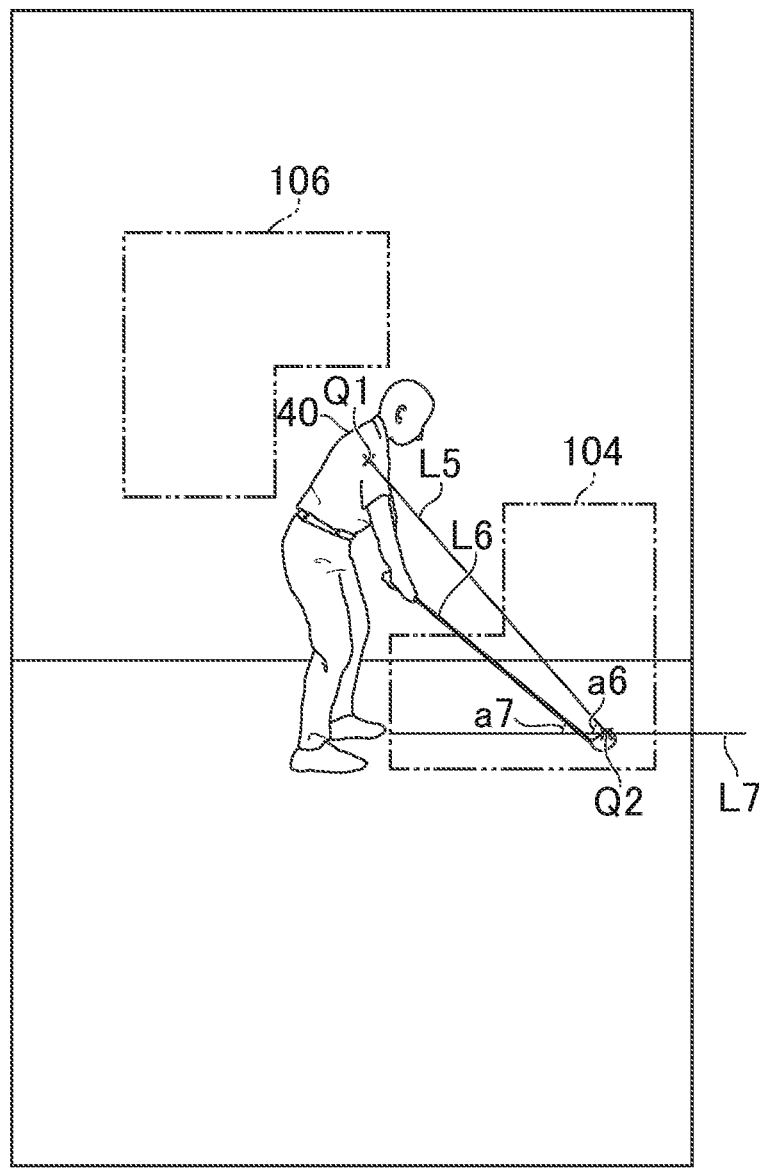
FIG. 19 is a diagram illustrating an example of a reference angle.

As shown in FIG. 19, the swing path type specifying unit 86 may specify a line L5 connecting the specified shoulder position Q1 with the initial position Q2 specified by the ball path specifying unit 78.

As shown in FIG. 19, the swing path type specifying unit 86 may also specify a line L6 along the shaft captured in the frame image.

Here, the swing path type specifying unit 86 may specify an address shaft detection area 104 and a backswing shaft detection area 106 shown in FIG. 19. Here, for example, the address shaft detection area 104 may be an area located at the lower right of the player area 96 and its position and size are uniquely specified based on the player area 96. The backswing shaft detection area 106 may be, for example, an area located at the upper left of the player area 96 and its position and size are uniquely specified based on the player area 96.

The swing path type specifying unit 86 may specify the frame image in which the shaft is detected in the backswing shaft detection area 106 as the frame image at backswing. The swing path type specifying unit 86 may generate a shaft detection image representing the difference between pixel values of pixels in the frame image at address and pixel values of corresponding pixels in the frame image at backswing in the address shaft detection area 104. Here, the top position frame image described above may be used instead of the frame image at backswing specified as described above.

The swing path type specifying unit 86 may apply a straight-line detection method, such as Hough transform, to the generated shaft detection images so as to specify the line L6 along the shaft.

The swing path type specifying unit 86 may then specify at least one reference angle based on at least one of the position of the predetermined body part of the player 40 at address or the position of the shaft at address, which are specified based on the captured video image.

Here, the swing path type specifying unit 86 may specify a first reference angle based on, for example, a position of a predetermined body part. The swing path type specifying unit 86 may specify a first reference angle based on the position of the predetermined body part and the position of the ball before swing.

For example, as shown in FIG. 19, the swing path type specifying unit 86 may specify, as the first reference angle a6, an angle formed between a line L7 extending in the left-right direction in the frame image and a line L5 connecting the shoulder position Q1 with the initial position Q2.

The swing path type specifying unit 86 may also specify a second reference angles based on, for example, the position of the shaft at address.

For example, as shown in FIG. 19, the swing path type specifying unit 86 may specify, as the second reference angle a7, an angle formed between the line L7 extending in the left-right direction in the frame image and the line L6 along the shaft.

In this manner, the reference angles represented in the two-dimensional image coordinate system of the captured video image may be specified.

The swing path type specifying unit 86 may specify a downswing angle of the club head in the captured video image based on the captured video image. For example, the swing path type specifying unit 86 may specify the downswing angle based on, for example, frame images of a predetermined number of frames before the impact.

For example, assume that the frame number of the frame immediately after the impact frame is m. Here, the positions of the club head on the movement path L1 of the club head specified as described above may be specified for four frames from the (m−5)-th frame to the (m−2)-th frame. Subsequently, a line representing the moving direction of the club head obtained by averaging the moving direction of the club head in the (m−5)-th frame to the (m−4)-th frame, the moving direction of the club head in the (m−4)-th frame to the (m−3)-th frame, and the moving direction of the club head in the (m−3)-th frame to the (m−2)-th frame may be specified as a line L8 along the downswing direction illustrated in FIG. 20.

Figure 20:
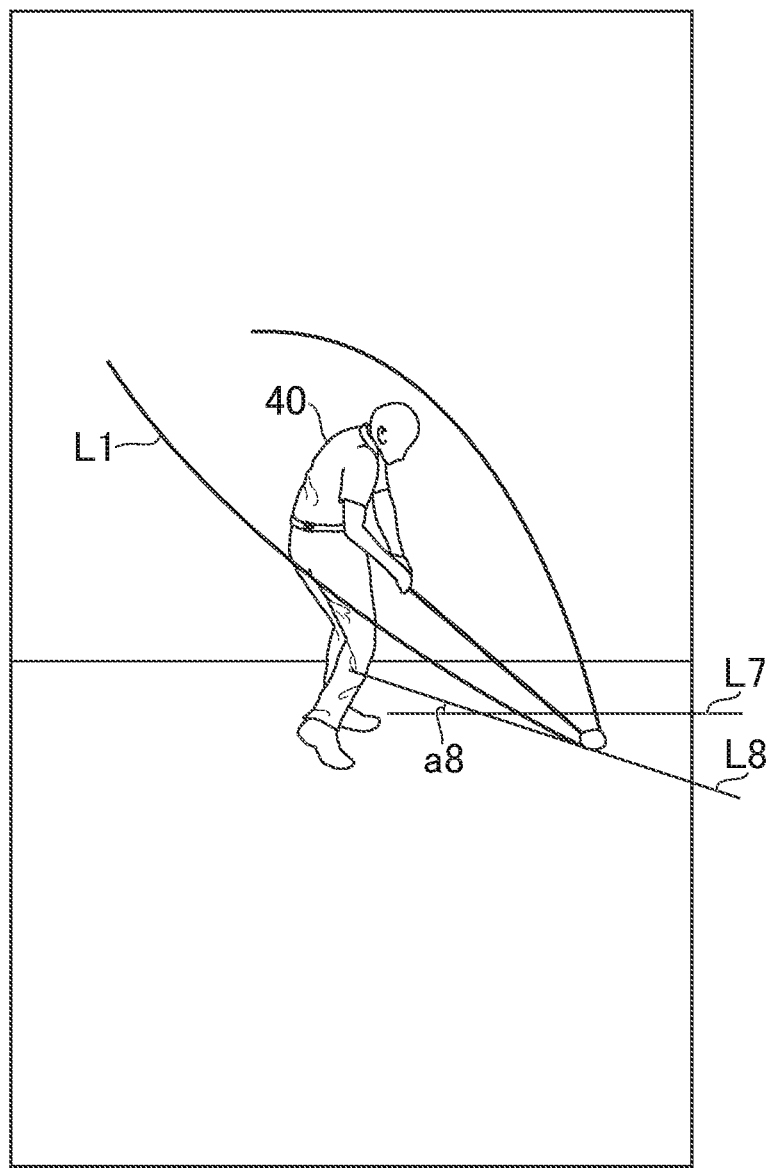
FIG. 20 is a diagram illustrating an example of a down-swing angle.

Alternatively, an approximate line along the positions of the club head in four frames from the (m−5)-th frame to the (m−2)-th frame may be specified as the line L8 along the downswing direction illustrated in FIG. 20. In this regard, the frames used for specifying the line L8 are not limited to four frames from the (m−5)-th frame to the (m−2)-th frame.

As shown in FIG. 20, the swing path type specifying unit 86 may then specify, as a downswing angle a8, the angle formed between the line L7 extending in the left-right direction in the frame image and the line L8 along the downswing direction described above.

In this manner, the downswing angle represented in the two-dimensional image coordinate system of the captured video image may be specified.

The swing path type specifying unit 86 may compare the reference angle with the downswing angle. The swing path type specifying unit 86 may specify a type of the swing path in the swing based on the result of comparing the reference angle with the downswing angle. For example, the swing path type specifying unit 86 may specify whether the swing path in the swing is inside-out, inside-in, or outside-in based on the first reference angle, the second reference angle, and the downswing angle.

For example, if the value of the downswing angle a8 is greater than the value of the first reference angle a6, the type of swing path may be specified as outside-in. In this case, the club is swung down from the outside (upper side) of the so-called V zone.

Further, if the value of the downswing angle a8 is equal to or more than the value of the second reference angle a7 and equal to or less than the value of the first reference angle a6, the type of swing path may be specified as inside-in. This case corresponds to the situation where the so-called swing path is kept within the range of the V-zone.

If the value of the downswing angle a8 is smaller than the value of the second reference angle a7, the type of swing path may be specified as inside-out. In this case, the club is swung down from the inside (lower side) of the so-called V zone.

In the present embodiment, the curve direction determining unit 88 determines the curve direction of the launched ball based on the path of the club head specified as described above and the launch direction specified as described above, for example. The curve direction determining unit 88 may determine the curve direction based on the moving direction of the club head and the launch direction.

The curve direction determining unit 88 determines the curve direction of the ball based on, for example, the difference between the signed club path angle a4 and the signed launch angle a5. For example, if the difference between the value of the signed club path angle a4 and the value of the signed launch angle a5 is less than a predetermined value, it is determined that the ball is not curved (flies straight). Further, for example, if the difference between the value of the signed club path angle a4 and the value of the signed launch angle a5 is the predetermined value or more and the value of the signed launch angle a5 is larger than the value of the signed club path angle a4, it is determined that the ball is curved to the left. For example, if the difference between the value of the signed club path angle a4 and the value of the signed launch angle a5 is the predetermined value or more and the value of the signed launch angle a5 is smaller than the value of the signed club path angle a4, it is determined that the ball is curved to the right.

The curve direction determining unit 88 may determine the curve direction and the magnitude of the curve of the launched ball based on the path of the club head and the launch direction. For example, the absolute value of the difference between the value of the signed club path angle a4 and the value of the signed launch angle a5 may be specified as a curve value indicating the magnitude of the curve. Further, for example, a curve evaluation value for evaluating the magnitude of the curve in several stages (e.g., three stages), such as "large", "medium", and "small", may be determined based on the magnitude of the absolute value of the difference between the value of the signed club path angle a4 and the value of the signed launch angle a5.

In the present embodiment, for example, the analysis video image generating unit 90 generates an analysis video image by overlaying an image indicating a result of swing analysis processing onto a captured video image.

The analysis video image generating unit 90 may generate an analysis video image by overlaying an image representing the path of the club head, the orientation of the club face at impact specified based on the launch direction, and the curve direction of the ball onto the captured video image. For example, an analysis video image may be generated in which the impact image 48 shown in FIG. 2 is overlaid on a frame image included in the captured video image. Here, the type of the swing path specified by the swing path type specifying unit 86 may be represented in the impact image 48 as the path of the club head.

Figure 21:
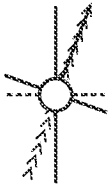
FIG. 21 is a diagram illustrating an example of a variation of the impact image.
Figure 21:
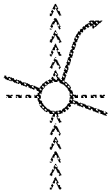
Figure 21:
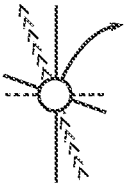
Figure 21:
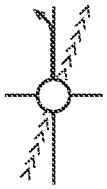
Figure 21:
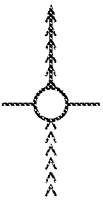
Figure 21:
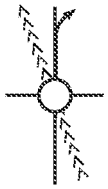
Figure 21:
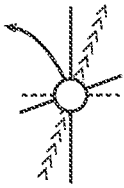
Figure 21:
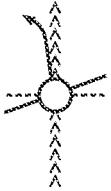
Figure 21:
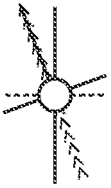

FIG. 21 is a diagram showing an example of a variation of the impact image 48. FIG. 21 shows nine types of impact images according to combinations of swing path types and face orientation types.

The impact images 48 shown in FIG. 21 reflect the types of swing paths, face orientations, and curve directions of the ball. The impact image 48 may reflect not only the types of swing paths, face orientations, and curve directions of the ball, but also the magnitude.

For example, the magnitude of the angle formed between the moving direction of the head (the direction in which the arrows are aligned) indicated by the head moving direction image 50 and the vertical direction may correspond to the magnitude of the club path angle a4 described above. Here, the magnitude of the angle formed between the moving direction of the head indicated by the head moving direction image 50 and the vertical direction need not be the same as the magnitude of the club path angle a4 described above. For example, the angle formed between the moving direction of the head indicated by the head moving direction image 50 and the vertical direction may be an angle that is determined based on the club path angle a4 according to a predetermined conversion rule.

For example, the angle formed between the moving direction of the head indicated by the head moving direction image 50 and the vertical direction may be determined based on the magnitude of the club path angle a4 from among the magnitude of the angles of several stages.

For example, as shown in FIG. 2, the magnitude of the angle formed between the extending direction of the linear face orientation image 52 and the left-right direction may be in accordance with the launch angle a5 described above. Here, the angle formed between the extending direction of the face orientation image 52 and the left-right direction need not be the same as the magnitude of the launch angle a5 described above. For example, the angle formed between the extending direction of the face orientation image 52 and the left-right direction may be an angle determined based on the launch angle a5 according to a predetermined conversion rule.

For example, the angle formed between the extending direction of the linear face orientation image 52 and the left-right direction may be determined based on the magnitude of the launch angle a5 described above from among the magnitudes of the angles of several stages.

The magnitude of the curve of the ball direction image 54 may correspond to the magnitude of the absolute value of the difference between the value of the club path angle a4 and the value of the launch angle a5. For example, when the absolute value of the difference between the value of the club path angle a4 and the value of the launch angle a5 is greater, the curve of the ball direction image 54 may be represented greater. For example, the magnitude of the curve of the ball direction image 54 may correspond to the curve evaluation value described above. The analysis video image generating unit 90 may generate an analysis video image in which a line representing the reference angle described above is overlaid on the captured video image. For example, the analysis video image generating unit may generate an analysis video image in which a line representing the first reference angle and a line representing the second reference angle are overlaid on the captured video image. For example, an analysis video image in which the V-zone image 56 shown in FIG. 2 is overlaid on a frame image included in the captured video image may be generated. As shown in FIG. 2, the V-zone image 56 is a triangle image, and its upper side corresponds to the line L5 shown in FIG. 19, and its lower side corresponds to the line L6 shown in FIG. 19. Here, for example, the V-zone image 56 may be positioned in the frame image such that the upper and lower sides of the V-zone image 56 pass through the initial positions described above.

As shown in FIG. 2, a belt-shaped club head path effect image 42 corresponding to the path of the club head specified as described above may be overlaid on the analysis video image. Further, a belt-shaped ball path effect image 44 corresponding to the path of the ball specified as described above may be overlaid on the analysis video image.

As shown in FIG. 2, the analysis video image may include analysis result information 46 indicating an analysis result of the swing analysis processing described above. For example, the analysis result information 46 may include information indicating values (e.g., initial ball speed, flight distance) calculated by the flight distance calculating unit 80 and information indicating a type of the swing path specified by the swing path type specifying unit 86.

In the present embodiment, for example, the analysis video image generating unit 90 stores the generated analysis video image in the analysis video image storage unit 92.

In the present embodiment, for example, the analysis video image storage unit 92 stores the analysis video image generated by the analysis video image generating unit 90.

In the present embodiment, for example, the display control unit 94 displays the analysis video image stored in the analysis video image storage unit 92 on the touch panel 26 in response to a request from the user of the user terminal 10. In this manner, the display control unit 94 may notify the user of the result of comparing the reference angle with the downswing angle described above. For example, the display control unit 94 may notify the user of the type of swing path specified based on the result of comparing the reference angle with the downswing angle described above.

Figure 22:
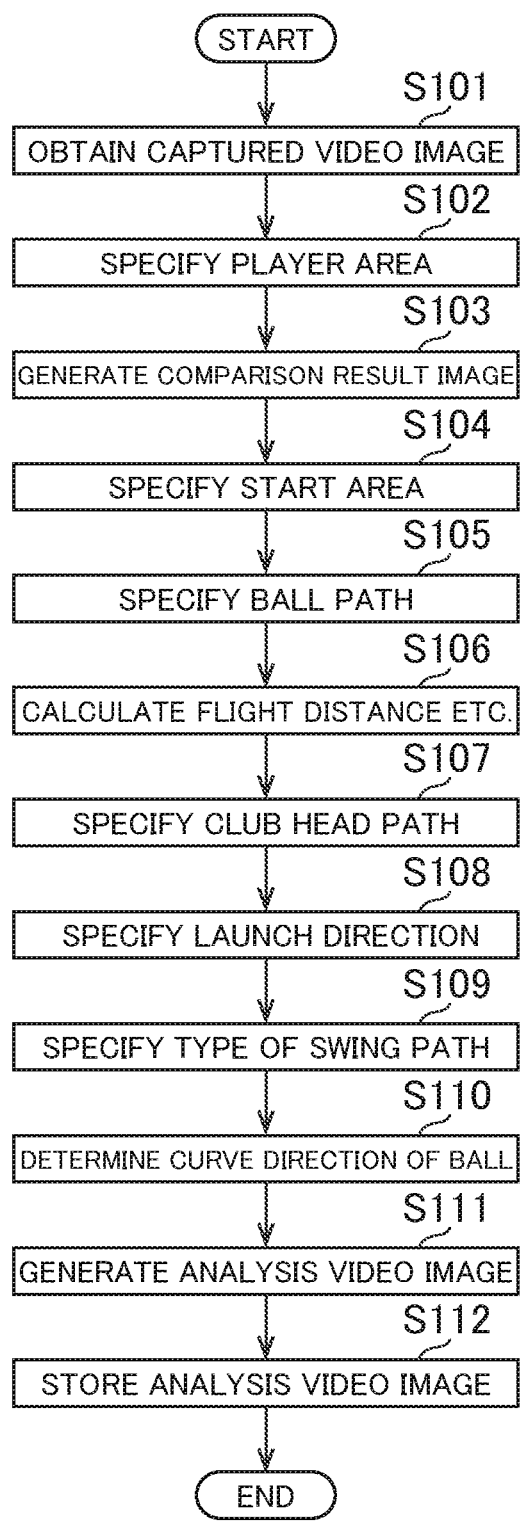
FIG. 22 is a flow chart showing an example of processing performed in the user terminal according to an embodiment of the present invention.

An example of the processing performed by the user terminal according to the present embodiment will be described referring to a flow chart shown in FIG. 22.

The captured video image obtaining unit 70 obtains a captured video image (S101).

The player area specifying unit 72 specifies a player area 96 (S102).

The comparison result image generating unit 74 generates a plurality of comparison result images based on the captured video image obtained in the processing in S101 (S103).

The start area specifying unit 76 specifies a start area 100 based on the player area 96 specified in the processing in S102 (S104).

The ball path specifying unit 78 specifies a path of a ball based on the comparison result images generated in the processing in S103 (S105).

The flight distance calculating unit 80 calculates a flight distance of the shot in the swing in the captured video image obtained in the processing in S101 (S106).

The club head path specifying unit 82 specifies a path of the club head based on the captured video image obtained in the processing in S101 (S107).

The launch direction specifying unit 84 specifies a launch direction of the ball based on the ball path specified in the processing in S105 (S108).

The swing path type specifying unit 86 specifies a type of the swing path in the swing in the captured video image obtained in the processing in S101 based on the path of the club head specified in the processing in S107 and the launch direction of the ball specified in the processing in S108 (S109).

The curve direction determining unit 88 determines a curve direction of the ball in the shot based on the path of the club head specified in the processing in S107 and the launch direction of the ball specified in the processing in S108 (S110).

The analysis video image generating unit 90 generates an analysis video image based on the captured video image obtained in the processing in S101 and the results of the processing in S105 to S110 (S111).

The analysis video image generating unit 90 stores the analysis video image generated in the processing in S111 in the analysis video image storage unit 92 (S112), and the processing shown in the present example is terminated.

As described above, in the processing in S109, the swing path type specifying unit 86 may specify the downswing angle and the reference angle. The swing path type specifying unit 86 may specify the type of the swing path in the swing in the captured video image obtained in the processing in S101 based on the specified downswing angle and the reference angle.

In the present embodiment, it is possible to accurately determine the curve direction of the ball by simply capturing the player making a golf swing without directly measuring the orientation of the face. In this manner, according to the present embodiment, a general player can easily analyze a golf swing using a smart phone or other devices in a golf course and a golf practice range, for example.

In the present embodiment, the reference angle and the downswing angle are compared with each other by simply capturing the player making a golf swing. As such, according to the present embodiment, a general player who does not have knowledge about golf, such as a range of an appropriate swing plane angle, can easily grasp whether the swing is correctly performed by checking the result of comparing the reference angle with the downswing angle.

In the present embodiment, the type of swing path in the swing is accurately specified based on the reference angle and the downswing angle as described above. As such, according to the present embodiment, a general player can easily grasp whether the swing is performed in the correct swing path by checking the type of the player's swing path.

The present invention is not limited to the embodiment described above.

For example, the first reference angle need not be specified based on the position of the shoulder, but may be specified based on the position of the neck of the player 40, for example.

Further, for example, the first reference angle need not be specified based on the initial position of the ball, but may be specified based on, for example, a position specified by the user or a position of the club head at address.

For example, the second reference angle need not be specified based on the position of the shaft, but may be specified based on the position of the waist of the player 40, for example. For example, the second reference angle may be specified based on a line connecting the position of the waist of the player 40 with the initial position of the ball, or a line connecting the position of the waist of the player 40 with the position of the club head at address.

Further, two reference angles need not be specified, and the type of swing path may be specified based on one reference angle. For example, whether the swing path is outside-in may be determined based on one reference angle. For example, whether the swing path is inside-out may be determined based on one reference angle.

All or some of the functions shown in FIG. 3 may be implemented in a server capable of communicating with the user terminal 10.

The specific character strings and numerical values described above, and specific character strings and numerical values in the drawings are illustrative only, and are not limited to these character strings and numerical values.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A golf swing analysis system, comprising:
   a camera;
   a display device;
   at least one processor; and
   at least one memory device storing instructions which, when executed by the at least one processor, cause the at least one processor to perform operations comprising:
   obtaining, via the camera, a captured video image in which a player making a golf swing is captured;
   specifying at least one reference angle based on a first line (i) passing through a position of a predetermined body part of the player at address or parallel to a position of a shaft at address and (ii) passing through a club head and a second line extending in a predetermined direction in a two-dimensional image coordinate system in a frame image included in the captured video image, the positions being specified based on the captured video image;

specifying a downswing angle of the club head captured in the captured video image based on the second line and a third line corresponding to a moving direction of the club in a plurality of frames of the captured video image prior to impact of the club head with a ball;

comparing the at least one reference angle with the downswing angle;

specifying a path of the ball captured in the captured video image based on a pixel block changing within a predetermined number of pixels and the comparing the at least one reference angle with the downswing angle;

generating an analysis video image in which the path of the ball is overlaid on the player making the golf swing in the captured video image; and displaying, on the display device, the analysis video image.

2. The golf swing analysis system according to claim 1, wherein the operations further comprise:

specifying a type of a swing path of the swing based on a comparison result of the at least one reference angle and the downswing angle.

3. The golf swing analysis system according to claim 2, wherein the operations further comprise:

specifying a first reference angle based on the position of the predetermined body part, specifying a second reference angle based on the position of the shaft, and specifying whether the swing path of the swing is inside-out, inside-in, or outside-in based on the first reference angle, the second reference angle, and the downswing angle.

4. The golf swing analysis system according to claim 1, wherein the specifying the at least one reference angle is based on the position of the predetermined body part and a position of the ball before the golf swing, the positions being specified based on the captured video image.

5. The golf swing analysis system according to claim 4, wherein the specifying the at least one reference angle is based on a position of the ball before the golf swing, the position being specified based on the path of the ball.

6. The golf swing analysis system according to claim 1, wherein the at least one reference angle is represented in a two-dimensional image coordinate system of the captured video image, and the downswing angle is represented in the two-dimensional image coordinate system of the captured video image.

7. The golf swing analysis system according to claim 1, wherein the operations further comprise:

obtaining the captured video image in which the player viewed from rearward of a target direction of the ball is captured.

8. The golf swing analysis system according to claim 1, wherein the first line and the second line representing the reference angle is overlaid on the captured video image in the analysis video image.

9. A golf swing analysis method performed by at least one processor of a golf swing analysis system, the method comprising the steps of:

obtaining, via a camera of the golf swing analysis system, a captured video image in which a player making a golf swing is captured;

specifying at least one reference angle based on a first line (i) passing through a position of a predetermined body part of the player at address or parallel to a position of a shaft at address and (ii) passing through a club head and a second line extending in a predetermined direction in a two-dimensional image coordinate system in a frame image included in the captured video image, the positions being specified based on the captured video image;

specifying a downswing angle of the club head captured in the captured video image based on the second line and a third line corresponding to a moving direction of the club in a plurality of frames of the captured video image prior to impact of the club head with a ball;

comparing the at least one reference angle with the downswing angle;

specifying a path of the ball captured in the captured video image based on a pixel block changing within a predetermined number of pixels and the comparing the at least one reference angle with the downswing angle;

generating an analysis video image in which the path of the ball is overlaid on the player making the golf swing in the captured video image; and displaying, on a display device of the golf swing analysis system, the analysis video image.

10. A non-transitory computer readable information storage medium storing a program that causes a computer in a golf swing analysis system to execute:

obtaining, via a camera in the golf swing analysis system, a captured video image in which a player making a golf swing is captured;

specifying at least one reference angle based on a first line (i) passing through a position of a predetermined body part of the player at address or parallel to a position of a shaft at address and (ii) passing through a club head and a second line extending in a predetermined direction in a two-dimensional image coordinate system in a frame image included in the captured video image, the positions being specified based on the captured video image;

specifying a downswing angle of the club head captured in the captured video image based on the second line and a third line corresponding to a moving direction of the club in a plurality of frames of the captured video image prior to impact of the club head with a ball;

comparing the at least one reference angle with the downswing angle;

specifying a path of the ball captured in the captured video image based on a pixel block changing within a predetermined number of pixels and the comparing the at least one reference angle with the downswing angle;

generating an analysis video image in which the path of the ball is overlaid on the player making the golf swing in the captured video image; and displaying, on a display device of the golf swing analysis system, the analysis video image.

\* \* \* \* \*